United States Patent
Davis et al.

(10) Patent No.: US 12,505,167 B1
(45) Date of Patent: Dec. 23, 2025

(54) ENHANCED STRING MATCH MATRIX GENERATION

(71) Applicant: U.S. BANK NATIONAL ASSOCIATION, Minneapolis, MN (US)

(72) Inventors: Christopher Davis, Minneapolis, MN (US); Christopher Ziolkowski, Burnsville, MN (US)

(73) Assignee: U.S. BANK NATIONAL ASSOCIATION, Minneapolis, MN (US)

( * ) Notice: Subject to any disclaimer, the term of this patent is extended or adjusted under 35 U.S.C. 154(b) by 0 days.

(21) Appl. No.: 19/314,179

(22) Filed: Aug. 29, 2025

(51) Int. Cl.
*G06F 7/00* (2006.01)
*G06F 16/93* (2019.01)
*G06F 40/30* (2020.01)

(52) U.S. Cl.
CPC .............. *G06F 16/94* (2019.01); *G06F 40/30* (2020.01)

(58) Field of Classification Search
CPC ................... G06F 16/94; G06F 40/30

USPC .................................................. 707/600–899
See application file for complete search history.

(56) References Cited

U.S. PATENT DOCUMENTS

2023/0169054 A1* 6/2023 Ghatage ................ G06F 16/215
707/692

* cited by examiner

*Primary Examiner* — Isaac M Woo
(74) *Attorney, Agent, or Firm* — ALSTON & BIRD LLP

(57) ABSTRACT

A method for remediating duplication errors associated with first and second documents includes obtaining a first document and a second document, generating a corresponding first document string set and a second document string set, generating a second document string subset that is a proper subset of the second document string set, dividing the second document string subset into second document substring, transforming the second document substrings into a synthetic substring set, converting the first document string set into first document embeddings in vector space, converting the synthetic substrings into synthetic embeddings, generate a closest embedding set of one or more first document embeddings, generating, using a respective one of the closest embedding sets and a linking string generator, a linking string defining an association between the respective substring and one or more respective first document portions, and generating a string match matrix data.

20 Claims, 10 Drawing Sheets

ENHANCED STRING MATCH MATRIX GENERATION

BACKGROUND

Various embodiments of the present disclosure address technical challenges related to efficient and accurate comparison of structured and unstructured text data and visual across heterogeneous document repositories. Traditional data analysis techniques often struggle with comparing and matching content across different formats, structures, and access privileges. This task is hindered by several technical challenges, including the difficulty of semantically comparing structured and unstructured text, identifying similarities across large-scale information repositories with varying access controls, and efficiently detecting and remediating duplicate or near-duplicate content. Additionally, traditional approaches to managing information repositories have struggled to efficiently handle the rapid proliferation of AI-generated content, leading to increased storage requirements, slower access times, and potential propagation of errors or inconsistencies across documents. These limitations have made it challenging to maintain data integrity, optimize storage utilization, and ensure proper access controls across large-scale, heterogeneous document collections.

Applicant has identified several problems associated with managing such systems and with remedying vulnerabilities of such systems and processes. Through applied ingenuity, the inventors have developed solutions to the aforementioned problems and more, many of which are described with respect to embodiments herein.

SUMMARY

Embodiments of the present disclosure are directed to various systems, computer readable media, and computer-implemented methods for enhanced string match matrix generation, AI training and validation, and database deduplication.

In some embodiments disclosed herein, a method for remediating duplication errors associated with first and second documents includes, with a set of one or more processors, obtaining a first document, wherein the first document comprises first document text content. The method further includes obtaining a second document, wherein the second document comprises second document first text content, second document second text content having delimiters in the form of one or more symbols or tags, and second document image content. The method further includes generating, using a string generation engine, a first document string set of first document strings associated with the first document. The method further includes generating, using the string generation engine, a second document string set of second document strings associated with the second document. The method further includes generating, based on the second document second text content but not on the second document first text content, a second document string subset of the second document strings. The method further includes dividing the second document string subset into second document substrings based at least on the delimiters. The method further includes generating a synthetic substring set of synthetic substrings, wherein the generating includes, for each respective second document substring of the second document substrings: synthesizing, using a multimodal generative artificial intelligence model, first related content from the second document first text content based on relevance to the respective second document substring, synthesizing, using the multimodal generative artificial intelligence model, second related content from the second document second text content based on relevance to the respective second document substring, synthesizing, using the multimodal generative artificial intelligence model, third related content from the second document image content based on a relevance to the respective second document substring, and generating, for inclusion in the synthetic substring set, a respective synthetic substring associated with the respective second document substring by providing the first related content, the second related content, and the third related content as input to the multimodal generative artificial intelligence model. The method further includes embedding the first document string set into vector space as first document embeddings using an embedding function. The method further includes embedding the synthetic substring set into the vector space as synthetic embeddings using the embedding function. The method further includes generating closest embedding sets, wherein the generating includes, for each respective synthetic embedding of the synthetic embeddings: comparing in the vector space using an embedding similarity algorithm the respective synthetic embedding with each respective first document embedding of the first document embeddings to generate embedding similarity values, each respective embedding similarity encoding a quantitative expression of similarity between the respective synthetic embedding and a respective first document embedding, and forming a closest embedding set that includes each of the first document embeddings that have an embedding similarity value to the respective synthetic embedding that satisfies a predetermined similarity value threshold or has a highest embedding similarity value. The method further includes, for each respective second document substring of the second document substrings, identifying an associated closest embedding set of the closest embedding sets that is associated with the respective second document substring, identifying a matching synthetic second document substring associated with the associated closest embedding set, identifying a plurality of matching first document strings of the first document strings that are associated with the associated closest embedding set, generating a respective linking string, using (1) the respective second document substring, (2) the matching synthetic second document substring, (3) the plurality of matching first document strings, and (4) a linking string generator, wherein the respective linking string describes an association between the respective second document substring and the matching first document strings, and generating, a string match matrix data structure comprising (1) rows ordered based on an ordering of the second document second text content and (2) columns, wherein each respective row is associated with at least one respective second document substring of the second document substrings and comprising a first cell associated with the respective row and a first column of the columns, wherein the first cell includes the at least one second document substring, a second cell associated with the respective row and a second column of the columns, wherein the second cell comprises a linking string associated with the at least one respective second document substring, and a third cell associated with the respective row and a third column of the columns, wherein the third cell includes the one or more first document strings used to generate the linking string of the second cell. The method further includes detecting a duplication error based on the string match matrix data structure. The method further includes transmitting a confirmation request regarding the duplication error, wherein the confirmation request includes the string match matrix data structure, and requests confirmation regarding initiating a remediation action selected from the group consisting of: deletion of the first document, hiding the first document, locking the first document, de-indexing the first document from search results, deprioritizing the first document in search results, redirecting links to the first document to the second document, granting privileges associated with the second document, allocating privileges associated with the second document.

In some embodiments, the method further includes receiving a response to the confirmation request regarding the duplication error. The method may further include initiating the remediating action based on the response indicating to proceed.

In some embodiments, the method further includes, after obtaining one of but not both the first document and the second document, generating, using a generative artificial intelligence system, synthetic strings based on the obtained document, and identifying, by the one or more processors, the other of the first document or the second document based on a similarity to the synthetic strings.

In some embodiments, obtaining the first document comprises accessing a first document set that includes the first document and accessing a second document set that includes the second document. In some embodiments, the method further includes, for each respective document of the second document set, extracting an extracted string from the respective document, generating a synthetic string based on the extracted string, comparing the synthetic string with each of document in the first document set, and determining to obtain the first document from among the first document set based on a similarity of the first document to the synthetic string being greater than a similarity of other documents of the first document set or greater than a threshold similarity.

In some embodiments, the method further includes generating the first document set, wherein the generating includes crawling sub-domains within a web domain and capturing each respective sub-domain as a respective document of the first set of documents.

In some embodiments, obtaining the second document comprises generating, using the string generation engine, a synthetic string. In some embodiments, the method further includes, for each respective document of a set of documents that includes the second document, generating a similarity score based on a similarity between the synthetic string and the respective document, and identifying the second document as having a highest similarity score or as being above a threshold similarity score.

In some embodiments, the first document has a first style and the second document has a second style different from the first. Obtaining the first document may includes generating, using the string generation engine, a synthetic string based on the second document substrings and mimicking the first style rather than the second style. In some embodiments, the method includes, for each respective document of a document set that includes the first document, generating a similarity score describing a similarity between the synthetic string and the respective document, and identifying the first document based on the first document having a highest similarity score or the similarity score being above a threshold.

In some embodiments, the first document includes first document text content and first document image content, the string generation engine includes a multimodal model, and generating, using the string generation engine, the first document string set includes generating at least some of the first document strings based on the first document image content.

In some embodiments, at least one first cell includes image content based on the first document image content, or at least one second cell includes image content based on the second document image content.

In some embodiments, the second document comprises one or more privileged portions relevant to the first document.

In some embodiments, the second document substrings comprise structured substrings corresponding to unstructured strings of the first document.

In some embodiments, obtaining the first document includes receiving a document generation contextual construct, and generating, using a string generation engine, the first document based at least in part on the document generation contextual construct.

The method may further include generating, by the one or more processors, a document generation contextual construct using a predetermined list of document objectives, wherein the predetermined list of document objectives is determined based on a frequency of one or more of the list of document objectives in a plurality of heterogeneously privileged document repositories.

In some embodiments, obtaining the second document comprises identifying a target component, generating, using the string generation engine and based on the target component, a target component description, retrieving one or more documents including the second document, embedding into vector space, using an embedding function, the one or more documents and the target component description, detecting satisfaction of a similarity condition between a location of the second document in vector space and the target component description in vector space, and responsive to detecting the satisfaction, determining to obtain the second document.

In some embodiments, generating the target component description includes receiving a document generation contextual construct comprising one or more strings describing the target component and one or more configurations, and generating, based at least in part on the document generation contextual construct, the first set of structured strings describing the target component.

In some embodiments, obtaining the first document comprises receiving the second document comprising the second document string subset of second document strings defining one or more privileged features, generating, using a string generation engine, one or more third sets of synthetic strings based on the second document, retrieving one or more additional documents, including the first document, each additional document comprising a respective additional document string set, with the respective additional document string set for the first document being the first document string set, converting the one or more third sets of synthetic strings into one or more third embeddings, converting each of the respective additional document string sets into one or more fourth embeddings, in vector space, comparing the one or more third embeddings and each of fourth embeddings, and detecting, based on the comparison, satisfaction of a similarity condition between at least one of the one or more third embeddings and at least one of the fourth embeddings associated with the first document.

According to another aspect of the present disclosure, a method includes identifying a target component and generating, using a string generation engine, target component strings describing the target component. The method further includes retrieving one or more documents, including a second document, from one or more repositories, the one or more documents each comprising at least a subset of structured strings. The method further includes converting, using an embedding function, the target component strings into target component embeddings. The method further includes converting, by the one or more processors and using an embedding function, one or more document strings from the subset of structured strings of the retrieved one or more documents into respective document embeddings. The method further includes, in vector space, comparing the target component embeddings and each of the respective document embeddings. The method further includes detecting, based on the comparison, satisfaction of a similarity condition between the target component embeddings and at least one of the document embeddings. The method further includes identifying, based on the satisfaction of the similarity condition, a duplication error by determining that the second document or a component associated with the second document lacks one or more privileges. The method further includes remediating the duplication error using the one or more privileges.

According to another aspect of the present disclosure, a method includes receiving a second document comprising a second document string subset defining one or more privileged components. The method further includes generating, using a string generation engine, second document synthetic strings based on the second document. The method further includes retrieving one or more additional documents, including a first document, each additional document. The method further includes converting them second document synthetic strings into synthetic embeddings. The method further includes converting each first document strings of the first document into first document embeddings. The method further includes, in vector space, comparing the synthetic embeddings with each respective first document embedding of the first document embeddings. The method further includes detecting, based on the comparison, satisfaction of a similarity condition between the synthetic embeddings and first document embeddings. The method further includes identifying, based on the satisfaction of the similarity condition, a duplication error by determining that the first document or a first component associated with the first document lacks one or more privileges associated with the second document. The method further includes remediating, by the one or more processors, the duplication error using the one or more privileges.

Other embodiments include corresponding systems, methods, and computer programs, configured to perform the operations as described herein, encoded on computer storage devices. The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
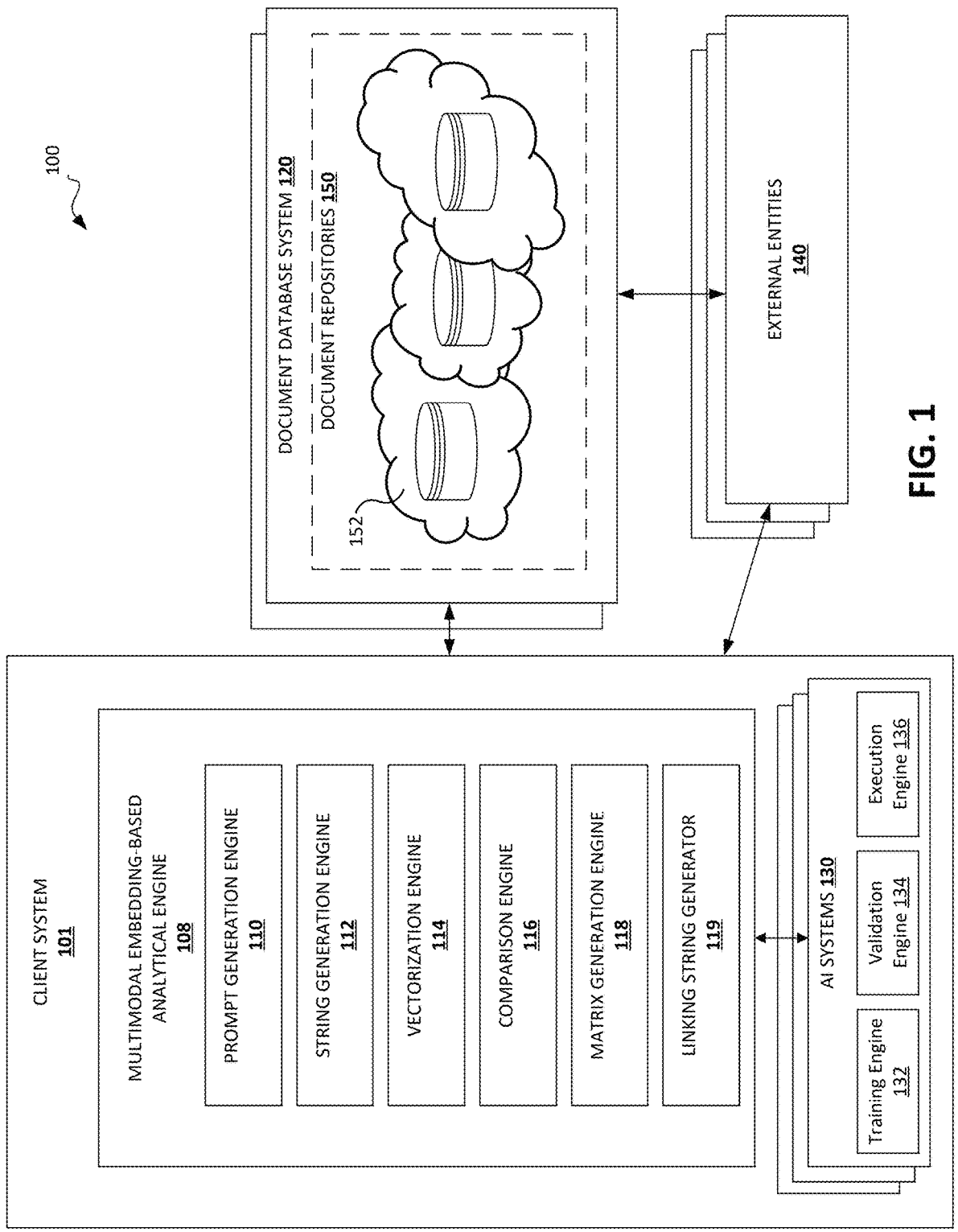
FIG. 1 illustrates an example system in accordance with at least one embodiment of the present disclosure.

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout.

Overview

Various embodiments of the present disclosure provide improved techniques for enhanced string match matrix generation that increase the efficiency and accuracy of document comparison, AI generation, and analysis tasks. To achieve this, the disclosed system employs a multi-stage process involving string generation, vectorization, and embedding comparison to identify similarities between structured and unstructured document content. By leveraging synthetic vectorizable substring sets and embedding functions, the system overcomes challenges in comparing heterogeneous document formats and structures, enabling more robust matching across diverse document repositories.

Embodiments discussed herein address limitations in traditional document comparison methods, including by introducing an intermediate synthetic substring generation step. This process augments substrings with contextual information extracted from related substrings, creating a more comprehensive representation for vectorization and comparison. By transforming both structured and unstructured strings into embeddings within a shared vector space, the system enables direct comparison of semantically similar content regardless of its original format and with more semantically aligned vectors via the synthetic substrings. This approach overcomes technical hurdles in natural language processing and information retrieval, allowing for more accurate identification of document similarities and potential duplication errors.

Rapid programmatic text generation systems, including those that use generative AI, may be used to generate documents faster and in larger volumes than have ever been achieved by traditional, manual document creation. This creation can lead to faster AI model training but at the cost of accuracy. Tools to validate this training data are inadequate. This increase in content generation capability has also increased the volume of substantively duplicate documents, which may otherwise not be experimentally-valuable, including documents uploaded to various repositories stored in distributed access database systems. Moreover, differences in structure or formatting introduced by generative AI models may leave duplicates difficult to identify and their effect on the modeling process difficult to determine. Each of the aforementioned issues may lead to vulnerabilities with database systems hosting such repositories, including an inability to find useful documents and a decline in function of the database systems as processing power requirements and storage space requirements increase to compensate for the increased volume of AI generated content. This decline may thereby lead to less accurate models and slower training times. Moreover, AI generated documents can quickly become voluminous, and the associated storage requirements can be impractical and/or resource intensive while also limiting performance of the repositories and processing circuitry accessing such repositories (e.g., indexing, read, and write speeds) and potentially introducing harmful versions of documents into downstream software and computing systems.

Embodiments of the present disclosure further enhance document management and data integrity through automated detection and remediation of duplication errors. The system leverages the generated string match matrix data structure to identify instances where documents or components lack proper privileges or contain unauthorized duplications. By automating this process, the system addresses challenges in maintaining data consistency and access control across large-scale, heterogeneous document repositories. This capability is particularly valuable in machine learning contexts, where it can improve the quality of training data by eliminating redundancies and ensuring proper attribution of privileged information, resulting in cleaner training databases and improved model performance and training speed. In conjunction, the embodiments described herein may allow rapid, autonomous monitoring and maintenance of training data sets for AI model training, and may facilitate rapidly scaling AI models using AI-generated synthetic training data without meaningful loss of quality or time consuming review and cultivating of the training data. AI training data generators that create synthetic training data sets may be used without substantially skewing the modeling results due to the rapid duplicate identification and removal provided by the various embodiments discussed herein. Further, the string match matrix data structures created via various embodiments of the present disclosure may provide validation and auditing (e.g., of AI model outputs) to ensure ongoing accuracy and to facilitate updating and maintaining the training data sets at scale. String match matrix data structures can facilitate providing explainability of results and reveal to a human reviewer or auditor the rationale behind whether and how two or more documents are similar.

The disclosed methods may provide additional advancements in AI model training and validation. By generating linking strings that define associations between matched document portions, the system creates a rich dataset for training and evaluating natural language processing models. This approach enables more nuanced understanding of document relationships, supporting the development of AI systems capable of sophisticated text analysis and generation tasks. The ability to automatically generate structured representations of document similarities addresses challenges in creating high-quality training data for machine learning models, particularly in domains requiring fine-grained text comparison and analysis.

Embodiments of the present disclosure include a client system that may, in some instances, receive or otherwise access two or more documents that may be compared to determine if either or both is a duplicate of or otherwise sufficiently matches the other or a third document. For example, the techniques described herein include operations configured to generate documents using one or more AI systems and identify duplication errors based on the generated documents. The techniques described herein provide mechanisms by which duplication errors which have been propagated through document repositories can be readily identified, including but not limited to one or more repositories with heterogeneously privileged documents. Further yet, the techniques as described herein provide mechanisms for obtaining privileges associated with the subject document if needed, thereby enabling an executing party to correct or otherwise address the subject duplication error(s), and ultimately triggering one or more remediation actions with respect to the duplication error, thereby minimizing further risks associated with the unpermissioned document usage.

Moreover, in some embodiments, the analysis and remediation processes disclosed herein may occur autonomously or semi-autonomously to facilitate self-management of scarce memory space by computing systems at a speed that is capable of avoiding runaway growth caused by rapid programmatic text generation systems. For example, in some embodiments, the analysis and remediation processes disclosed herein may operate entirely autonomously, beginning in the background of one or more other processes or running continuously or periodically on one or more database systems to maintain the integrity of and reduce vulnerabilities in such database systems.

Example Terminology

As used herein, the terms "data", "content", "digital content", "digital content object", "information", and similar terms may be used interchangeably to refer to data capable of being transmitted, received, and stored in accordance with embodiments of the present disclosure. Thus, use of any such terms should not be taken to limit the spirit and scope of embodiments of the present disclosure.

Where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and the like.

As used herein, the term "circuitry" refers to particular hardware configured to perform the functions associated with the particular circuitry as described herein. In some embodiments, circuitry may be used as part of (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. In some embodiments, "circuitry" may include processing circuitry, storage media, network interfaces, input/output devices, and/or the like. As a further example, as used herein, the term "circuitry" also includes an implementation comprising one or more processors and/or portion(s) thereof and accompanying software and/or firmware. As another example, the term "circuitry" as used herein also includes, for example, a baseband integrated circuit or applications processor integrated circuit for a mobile phone or a similar integrated circuit in a server, a cellular network device, other network device, and/or other computing device.

As used herein, a "computer-readable storage medium", refers to a physical storage medium (e.g., volatile, or nonvolatile memory device), and may be differentiated from a "computer-readable transmission medium," which refers to an electromagnetic signal.

As used herein, the terms "data structure", "data entity", "data object", or "data set" may be used interchangeably to refer to data capable of being transmitted, received, and/or stored.

As used herein, the term "access" refers to the ability to at least receive, retrieve, view, make available, make use of, or the like, various data associated with embodiments described herein.

As used herein, the term "document database system", "database", and/or the like, may be used to interchangeably refer to one or more computer-readable storage media where data, including but not limited to data stored in one or more repositories, is stored, accessed, modified, and otherwise maintained, such as by a computing system or as part of a computing system. A database system may be used to store data in association with a data storage protocol and/or a query language. In certain embodiments, a database system may embody a data storage device or devices, a separate database server or servers, or as a combination of data storage devices and separate database servers in one or more physical locations. Further, in some embodiments, a database system may be embodied as a distributed system such that some of the stored data is stored centrally in a location within the system(s) and other data stored in a single remote location or a plurality of remote locations. Alternatively, in some embodiments, a database system may be distributed over only a plurality of remote storage locations, such as in a cloud storage environment. In various embodiments of the present disclosure, one or more database systems may be used to store one or more documents and to permit accessing, executing, editing, copying, deleting, and other functions associated with the one or more documents. In some embodiments, a database system may have multiple independent entities interacting with it, including but not limited to collaboratively between multiple users, individually, or with mixed privileges (e.g., read-only access for at least one user, write access for at least one user, etc.). In some embodiments, the document database system may be cloud based. In some embodiments, the document database system may include the Internet and one or more publicly-viewable repositories accessible via the Internet.

As used herein, a "distributed access database system" refers to a database system having heterogeneously privileged documents at least a portion of which are accessible by different computing systems and/or users. Examples of a distributed access database system include various public libraries and database systems allowing documents to be accessed by the public or by various groups of individual users and systems. In some embodiments, one or more AI based document generation systems may be integrated into or programmatically associated with one or more database systems, and in some embodiments, one or more separate AI based document generation systems may be used. As used herein, a "repository" refers to a storage location within a database system assigned to at least one document. A repository may, in some examples, include all documents associated with at least one AI model generation process. In some embodiments, a repository may include all files, folders, version history, and other data and documentation related to the documents stored in the repository. A repository may be spread across multiple physical devices and portions of a repository may have different privileges associated with them.

As used herein, the term "similarity condition" refers to any one or more criteria or rules used to evaluate whether two pieces of content (e.g., two documents, subsets of documents, strings, substrings, or the like) are the same or sufficiently similar to each other. In some embodiments, satisfying one or more similarity conditions may indicate that one piece of content (e.g., document) corresponds to another piece of content. The various solutions discussed herein may include means for determining similarity between two structurally and/or semantically dissimilar pieces of content (e.g., structured strings and unstructured strings) as well as other content. Similarity conditions may leverage one or more thresholds for determining the bounds of the condition (e.g., greater than 99%, 98%, 95%, 90%, or the like similarity, or with a similarity score above a predetermined threshold). In some embodiments, a similarity condition may include a similarity score that may be programmatically calculated for two pieces of content (e.g., documents) or portions thereof. Similarity may refer to a quantitative or qualitative measure used for comparing with a similarity condition and may indicate whether and/or how much two documents, such as a source document and a synthetic document as used herein, resemble one another. A similarity threshold based on such calculations may be set as a similarity condition for the various processes described herein. The similarity condition may be determined based on a comparison of two vectors in vector space (e.g., embedding similarity value) being within a predetermined threshold or other criteria of each other. Satisfaction of one or more similarity conditions may be considered a "match" between the compared strings or other data. Different users may use different embodiments for different purposes and may vary the thresholds and other similar conditions accordingly. This tuning may be driven by a relative tolerance for false positives and false negatives.

As used herein, the terms "prompt," "AI prompt," "machine learning prompt," and the like may be used to refer to input or instructions configured to cause and/or guide an AI model towards producing a desired response. A prompt may include various formats and data types, including but not limited to, text (e.g., natural language, human readable code, machine readable code, form fields, or check boxes) or images (e.g., screenshots of documents). Example prompt types include, but are not limited to, instructional prompts, conversational prompts, few-shot prompts, zeroshot prompts, and/or code prompts. In some embodiments, a prompt may include one or more of an input text, an intent or goal specifying what the user wants, and/or additional context such as information defining background or framing information to improve output relevance and coherence and/or constraints, limits, or other guardrails such as length, structure, or style. In some embodiments, predetermined context may be accessed by the AI model in parallel (e.g., from one or more repositories) without forming a portion of the prompt or by modifying an initial user input to generate the prompt. In various embodiments, a generative AI model may be trained to generate one or more prompts based on publicly available human generated natural language (e.g., forum posts, customer service chat histories, or the like), and the generative AI model (e.g., an LLM) may be tuned to simulate how a human would prompt an AI based code generator.

In some embodiments, prompts may be autonomously input into an AI model (e.g., generating suggested content during a manual document editing process in which a partial content item has been written or during a search process) and/or autonomously generated based on various data (e.g., a document generation prompt). In some embodiments, prompts may be generated manually and/or semi-manually (e.g., user-edited or directed).

As used herein, the term "document generation prompt" may be used to refer to a prompt as described above intended to cause and/or guide a generative AI system towards producing a response, which may include at least document or set of strings for a defined function and/or purpose defined at least in part by the prompt. In some embodiments, a document generation prompt may be generated autonomously or semi-autonomously (e.g., by the client system) in response to one or more inputs or triggers. In some embodiments, a user may generate a document generation prompt. In some embodiments, a document generation prompt may include or reference (e.g., via link or file location) document generation contextual construct.

As used herein, the term "document generation contextual construct" may refer to a set of parameters, instructions, or specifications that provide context and guidance for generating a document or other content. This construct may include information such as the intended purpose or goal of the document, specific topics or themes to be addressed, desired document structure or format, target audience, tone or style preferences, and any constraints or requirements for the generated content. In some embodiments, the document generation contextual construct may include a configuration file that is pre-generated by a user with any one or more preferences including the aforementioned information. The document generation contextual construct may serve as input to guide AI systems, including natural language processing tools or other document generation processes in creating relevant and appropriately tailored documents or textual content. In some embodiments, a single document generation contextual construct may be used for multiple generation workflows and processes. In other embodiments, multiple document generation contextual constructs, reflecting similar or different perspectives on similar or different topics, themes, parameters, or specifications may be synthesized together to provide such context and guidance. The document generation contextual construct may, in some embodiments, include information specific to a particular generation process, such as a seed document or specific prompt, or such information may be included with the document generation contextual construct as part of the prompt. In some embodiments, the document generation contextual construct may include sample text, keywords, or other seed information to inform the document generation process. The document generation contextual construct may be provided in various forms, such as a structured data object, a natural language description, or a combination of formatted inputs and free-form text stored in one or more computer-readable forms.

As used herein, the terms "AI system", "AI implementation", and the like may be used to refer to a self-contained, functional unit embodied in software or a combination of hardware and software and configured to perform a specific task or set of tasks related to learning, reasoning, perception, or decision making. An AI system may integrate one or more AI models and supporting components (e.g., one or more software functions) to perform intelligent tasks such as generating text (e.g., code, prompts, documents, or the like), understanding language, recognizing patterns, analyzing data (e.g., document comparison), making decisions, or interacting with the environment. An AI system may comprise AI models (including generative AI models), trained algorithms, data pipelines, inference engines, user interfaces, APIs, and/or feedback loops. AI systems may be triggered or instructed to perform one or more tasks with a prompt. AI systems may include agents comprising one or more AI models and configured to autonomously perform tasks leveraging an AI model. As used herein, the term "AI model" may be used to refer to software and/or a combination of software and hardware configured to use artificial intelligence techniques, such as large language models, to write or assist in writing an output. One or more AI models may be employed by an AI system. As used herein, AI models may be inclusive of generative AI models.

As used herein, the term "AI model", "artificial intelligence", and similar terms refer interchangeably to one or more processes, algorithms, and/or other data entity that describes parameters, hyper-parameters, defined operations, and/or defined mappings of a model that is configured to process one or more inputs in accordance with one or more trained parameters of the AI model (e.g., a machine learning model) in order to generate a prediction. An example of an AI model is a mathematically derived algorithm (MDA) designed to simulate intelligent behavior. An MDA may comprise any algorithm trained using training data to predict one or more outcome variables. Without limitation, an MDA, as used herein, may comprise AI model frameworks including neural networks, diffusion models, generative adversarial networks, convolutional neural networks, recurrent neural networks, text-to-video models, video-to-text models, text-to-speech models, speech-to-text models, large language models, generative pre-trained transformers (GPT), support vector machines, gradient boosts, decision trees, random forests, Markov models, adaptive Bayesian techniques, and statistical models (e.g., timeseries-based forecast models such as autoregressive models, autoregressive moving average models, and/or an autoregressive integrating moving average models). Additionally, and without limitation, an MDA, as used in the singular, may include ensembles using multiple machine learning and/or statistical techniques.

The term "generative artificial intelligence model", "generative AI model", "generative AI", AI used for "generation", and similar terms may be used interchangeably to refer to one or more artificial intelligence models, including but not limited to some example machine learning models, configured to generate new outputs in response to a prompt or other input data. Generative AI models may include, but are not limited to, transformer-based models, such as generative pre-trained transformers (GPT), diffusion models, or based on other technologies. In some instances, a generative AI model may be a domain-specific large language model (LLM), which may be fine tuned for specific tasks, such as document generation. In some embodiments, generative AI models may be trained via supervised learning.

As used herein, the term "duplication error" refers to a detected duplication of a document or a subset of a document. In some examples, the duplication error may relate to an underlying component (e.g., one or more systems, methods, or apparatuses) associated with or described by the document beyond merely the document itself. Duplication may include identical copies of documents; variants that are substantially similar copies of documents (e.g., within a threshold similarity score), such as variants of a particular document or document subset that might be generated as an output by an AI generator trained using the particular document or document subset or such as parallel outputs by an AI generator using the same prompt or a similar prompt; and/or variants that comprise the same or substantially the same substance in one or more different forms (e.g., structured vs unstructured strings or duplication between a document and underlying systems, methods, or apparatuses associated with another document or between underlying systems, methods, or apparatuses associated between multiple documents). Duplication errors may result in matching documents both being used with an AI model or other data application that may be skewed by the use of duplicates that do not provide experimental value and bias the results of the model training.

In a duplication error, one document, or a portion thereof, having structured strings with an earlier creation time and/or being the more accurate version may be referred to as a "source document", an "original document", a "privileged" or "permissioned" document, or similar terms, and a duplicate document (e.g., an unpermissioned synthetic document) having a later creation time and/or being the less accurate/incomplete version may be referred to as the "duplicate document", "subject document", "copied document", or similar terms. The original document may include one or more structured strings comprising the privileged features associated with the document and/or a component associated with the document. The structured strings may define the scope of the privileges which may then be used to remove or otherwise remediate duplicates in either structured or unstructured strings. Remediating duplication errors may ensure that privileged, structured strings are usable for AI model training and validation without either (a) skewing the model with duplicate strings all related to a given component or document or (b) creating flaws in the model with unprivileged, duplicate content (e.g., synthetic duplicates in some instances) that lower the accuracy of the model. As used herein, privileges may also refer to a flag associated with a document that indicates if the document is to be included in a training data set. Duplicate detection and remediation may allow rapid training of an AI model by using synthetic training strings with sufficient experimental value to produce a robust model in a predictable manner that avoids the pitfalls of unfettered AI-generated synthetic training data. For example, using the duplication error detection processes disclosed herein, the system may be configured to eliminate all but a single, structured version of a given string set from a training data set. This process may occur fully or semi-autonomously such that the duplicates may be excised from the training data set in a similar speed and scale to the speed and scale of the synthetic training data generation.

In some embodiments, a duplication error may be detected within a document in a repository. A duplication error may refer to a privilege error, such as an unpermissioned document/document subset for which a user or system using the unpermissioned document lacked privileges for the subject document. In some instances, a duplication error may include two functional or accurate versions of the same document or substantially similar document, which nonetheless must be remediated to avoid skewing AI model training. A duplication error may be remediated via one or more processes described herein, including but not limited to deleting the duplicate document subset, hiding the duplicate document subset, locking the duplicate document subset, de-indexing or deprioritizing the duplicate document subset in search results (e.g., such that the original document appears before the duplicate document in searches and/or the duplicate document does not appear), causing searches and/or links to the unpermissioned document to redirect to the source document, and/or allocating privileges associated with the original document (e.g., to systems, parties, entities, users, or the like associated with the duplicate document). One or more of the remediation actions may occur fully autonomously, semi-autonomously (e.g., with user approval and/or selection), and/or manually.

As used herein, the term "component" refers to any datum, entity, feature, concept, or the like about which strings or other content may comprise information. Components may represent a wide range of elements for which data (e.g., in the form of strings) may be stored within a computing system or software application that can be described, analyzed, or manipulated as part of various processes. One or more documents or the strings and substrings therein may comprise information about or directly or indirectly associated with a component. Data associated with components and the attributes and features of such components can be stored as structured strings (e.g., in a hierarchical data structure), as unstructured strings (e.g., in product descriptions or reviews), other data types, or combinations thereof. Machine learning models may process these components, converting their attributes into numerical representations or embeddings for further analysis and comparison. In some embodiments, a component may represent a product, service, or other entity associated with a string or document comprising a set of strings.

As used herein, the term "document" refers to a grouping or set of strings or other data structures (such as image data) that functions as an independent unit from other documents. Documents serve as fundamental units of information storage and retrieval in various computing systems and applications. Documents can be implemented and managed using various data structures and storage mechanisms. For example, documents may be stored in file systems as individual files with associated metadata, or they may be represented as records or objects within databases. In relational database systems, a document might be stored as a row in a table, with different columns representing various attributes or components of the document. In document-oriented databases or NoSQL systems, documents may be stored as self-contained JSON or BSON objects, allowing for flexible schema designs and efficient retrieval of hierarchical data structures. The use of documents spans across numerous applications and domains. Document contents (e.g., strings) may be analyzed, tokenized, and stored in inverted indices to enable efficient querying. Document processing pipelines may involve various stages of natural language processing, including tokenization, parsing, and semantic analysis, to extract meaningful information and facilitate tasks such as classification, summarization, or translation.

Documents can take any of a variety of forms including but not limited to: files produced by word processors, products of messaging applications (e.g., emails), web sites (e.g., HTML documents), web pages, others, or combinations thereof. Example documents include: reports, narrative text documents, prose text documents, academic assignments, legal documents, contracts, patents, essays, articles, product descriptions, application descriptions, software descriptions, medical records, other documents, or combinations thereof. In addition, some documents may be in the form of source code.

Documents can be dynamically generated, modified, or translated between different formats to suit various use cases. For instance, a document initially stored as structured data in a database may be rendered as a human-readable HTML document for web display, converted to a PDF for archival purposes, or transformed into a machine-readable format like XML for data exchange between systems. Various systems discussed herein may be configured to translate strings associated with documents between formats, such as from structured strings to unstructured strings, and vice versa. This flexibility allows documents to serve as versatile containers of information, adaptable to different contexts and requirements within computing environments.

As used herein, "entity", "party", and similar terms may be used interchangeably to refer to an individual, organization, group, system, or other body or bodies. Such terms may be used in the present disclosure to differentiate various systems, code, or the like. Similarly, the use of numbers may be included to differentiate different entities, parties, or the like within a given example. For example, "third-party document" and "fourth-party document" may be associated with at least partially different entities (e.g., differing in control, authorship, privilege, or another aspect with respect to at least one entity of one or more entities).

As used herein, "privilege", "privileges", "privileged", "permissions", "permissioned", and similar terms refer to the ability of an entity to use, execute, access, or perform other actions with respect to content (e.g., documents) or components. Privileges may include a flag stored in memory configured to indicate that a document, or portion thereof, is linked to a structured string set of a structured document or document subset, such that the privileged document corresponds to the document or document subset. For example, privileges may be allocated to flag documents or portions of documents or strings which are usable for AI model training or other data based functions. Privileges may additionally or alternatively refer to the accessibility and/or usability of such documents, portions of documents, or strings by one or more entities (e.g., to be incorporated in such entities' training data or other workflow). Privileges may be generated and stored as data objects in a repository or in association with a repository to grant access to such content to privileged entities. In some embodiments, privileges may include credentials or other proprietary data transmitted from an entity to another entity to independently verify such privileges with or without stored privileges associated with the entity. In some embodiments, privileges may be stored in association with an entity account and may be applied autonomously (e.g., such that the entity has automatic access to the permissioned content) and/or with manual verification (e.g., by entering credentials, such as a password associated with the privileges). In some instances, one or more entities may control the privileges for one or more particular content items (e.g., documents). As used herein, "unpermissioned" or "unprivileged" may refer to content or an entity that lacks such privileges. As used herein, "heterogeneously privileged" refers to content having diverse privileges. For example, heterogeneously privileged documents may refer to two or more documents having different permissions relative to each other (e.g., a first document permissioned to a first party but not a second party and a second document permissioned to the second party but not the first party). Heterogeneously privileged documents may also include multiple documents having the same or overlapping permissions.

As used herein, the term "string" refers to a sequence of characters. A string may represent at least a portion of a document, and in some embodiments, a string may be a discrete section or unit of a document. A string may comprise any combination of alphanumeric characters, symbols, or other textual elements that form a coherent unit within a larger document or other data structure. Strings serve as building blocks for organizing and representing textual data in various computing applications, including document processing, data analysis, and artificial intelligence model training. Strings may be implemented as arrays or linked lists of characters in computer memory. Strings may be stored using various character encoding schemes such as ASCII or Unicode, allowing for representation of a wide range of languages and symbols. In natural language processing tasks, strings may represent words, sentences, or entire documents. In the context of document analysis and comparison, strings can be extracted from documents and processed to generate embeddings or vector representations for similarity analysis and enhanced string match matrix generation. These representations enable efficient comparison and matching of textual content using techniques such as cosine similarity or Euclidean distance calculations in vector space. Alternative uses of strings include their application in structured data formats like JSON or XML, where they may represent keys or values. In database systems, strings often serve as identifiers or searchable content fields. The versatility of strings allows them to be used across various domains and applications, from simple text manipulation to complex language understanding tasks in artificial intelligence systems. As used herein, "synthetic" strings may refer to strings generated by a generative AI model or other artificial text generation process, and "original strings", "source strings", or other similar terms may refer to strings generated by human operators or otherwise not synthetically generated as part of the processes described herein.

As used herein, the term "structured strings" and similar terms refer to hierarchically ordered strings formatted into discrete expressions, such as those that are for use in training artificial intelligence models or for use in organizing information. Sets of structured strings may be organized in a stacked dependency-based relationship, often with one or more primary strings serving as root nodes in the hierarchy. In some embodiments, the structured strings may be formed according to a particular sequence. This structured format allows for clear representation of relationships and dependencies between different elements of textual data. Structured strings may be implemented using tree-like data structures such as binary trees or more complex hierarchical structures, including numbered lists of natural language strings. These data structures allow for efficient traversal and manipulation of the hierarchical relationships. In computer memory, structured strings might be represented using linked lists or arrays with additional metadata to capture the hierarchical information. In some examples, a structured string may comprise strings (or sub-strings) that are set off from each other using any of a variety of separators. In some examples, symbols may be used as delimiters to separate different portions of the string structure (e.g., using commas, spaces, tabs, colons, semi-colons, line breaks, other techniques, or combinations thereof). In addition or instead, different tags (e.g., XML tags) or formatting techniques (e.g., color, indentation, or spacing) may be used to indicate different portions of the structured strings.

Structured strings are particularly useful in natural language processing tasks and other artificial intelligence model training or other tasks that require understanding of syntactic or semantic relationships within text or a document. For example, in parsing tasks, sentences may be represented as structured strings to capture grammatical relationships between words. In artificial intelligence contexts, structured strings can provide input features for models that need to understand hierarchical relationships in data. The hierarchical nature of structured strings allows for more nuanced and context-aware processing compared to flat, unstructured strings. This can lead to improved performance in tasks such as natural language processing. Additionally, the discrete, well-defined format of structured strings makes them amenable to algorithmic processing and feature extraction, which may facilitate training effective artificial intelligence models.

As used herein, the term "unstructured strings" refers to freeform strings not necessarily organized according to any specific organizational structure or format. Unstructured strings may represent raw, unprocessed textual data as it might appear in natural language documents, social media posts, component descriptions, or other sources of human-generated text. In some embodiments, however, the unstructured strings may be arranged sequentially (e.g., into phrases or sentences). These strings lack the predefined structure or hierarchy found in structured data formats Unstructured strings may be stored as simple character arrays or text blobs in computer memory or databases. Unlike structured data, which can be easily parsed and indexed, unstructured strings require more sophisticated processing techniques to extract meaningful information and lead to poorer performance when attempting (if at all) to train artificial intelligence models. Structuring or translating unstructured strings may comprise the use of natural language processing algorithms and machine learning models to identify patterns, entities, and relationships within the text.

As used herein, the term "natural strings" refers to strings organized as natural language, representing human-readable text in its typical form. Natural strings encompass text organized in written language, including grammatical structures, idiomatic expressions, and contextual nuances associated with human communication. Strings, including natural strings, may be processed using natural language processing (NLP) techniques, which may comprise tokenization to break the strings into individual words or subwords, part-of-speech tagging to identify grammatical elements, and syntactic parsing to understand sentence structure. Advanced NLP models, such as recurrent neural networks (RNNs) or transformers, may be used to capture the sequential and contextual nature of natural language.

As used herein, the term "substrings" refers to component string portions that make up a string. Substrings are contiguous sequences of characters within a larger string, representing smaller units of textual information. These can range from individual characters to words, phrases, or any arbitrary subset of the original string. In some embodiments, structured substrings may be delineated according to one or more formatting protocols (e.g., rows, specific characters, expressions, or the like). In some embodiments, substrings may be generated or divided from larger strings through string slicing operations, which involve specifying start and end indices within the original string. Some embodiments may use data structures, such as suffix trees or suffix arrays, to enable rapid substring separation, searching, and comparison. Substrings may represent individual tokens or n-grams for processing by one or more artificial intelligence models. The substrings may allow for flexible manipulation and analysis of text data in various documents. For instance, in the context of structured strings, substrings might correspond to individual elements or sub-elements within the hierarchical structure. In unstructured or natural strings, substring extraction can be used to isolate specific pieces of information, such as dates, names, or other entities of interest. This granular approach to text analysis enables more precise and targeted processing of textual data.

As used herein, the term "linking string" refers to a description (e.g., which may be AI generated) connecting and explaining the relationship between two other strings. A linking string serves as a bridge between different textual elements, providing context and clarification about how they relate to each other. This AI-generated content enhances the interpretability and coherence of connections identified between various strings or text segments. Linking strings may be generated using AI systems comprising natural language generation (NLG) generative AI models, often based on advanced architectures like transformer or diffusion networks as described herein. The various models described herein may take as input the strings to be linked, along with any relevant contextual information, and produce a human-readable explanation of their relationship. The generation process may involve techniques such as attention mechanisms to focus on relevant parts of the input strings, and beam search for generating coherent and diverse outputs. In the present disclosure, the linking strings can provide explanations for why two documents or sections are considered similar. The use of linking strings can significantly enhance the explainability and transparency of AI systems that process textual data and allow rapid auditing and troubleshooting of AI models and training data. By providing human-readable explanations of relationships between strings, these AI-generated descriptions can help users understand the reasoning behind automated text analysis and comparison processes.

As used herein, the term "string match matrix data structure" refers to an organized data structure that identifies and relates two or more structured and/or unstructured strings, substrings, combinations of strings or substrings, documents, portions of documents, and/or combinations thereof. A string match matrix or table data structure typically comprises a plurality of rows, each row associated with a structured string or substring and containing one or more cells (e.g., broken up according to columns) that describe (i) the string or substring (e.g., a structured string or a substring), (ii) one or more corresponding strings or substrings (e.g., unstructured strings or substrings), and (iii) optionally, a linking string explaining the relationship between the elements or strings.

The string match matrix data structure leverages structured comparisons of distinct strings to facilitate efficient comparison and analysis of string data. The comparisons may include or be based on vector space representations, embedding techniques, and similarity algorithms, and the resulting analysis may be organized into a string match matrix data structure in human and/or machine readable form. The string match matrix data structure may be implemented in computer memory as a two-dimensional array, a linked list of arrays, or other data structures optimized for efficient access and manipulation of the stored relationships, which structures may be sorted, searched, and/or fed into one "or more AI training algorithms or used to validate one or more AI training algorithms. In addition or instead, the string match matrix data structure can be provided in a human-readable format, such as to aid in a reviewer understanding connections made in a linking string.

The string match matrix data structure serves multiple purposes in artificial intelligence and machine learning applications. It can be used as training data for AI models, enabling the models to learn relationships between structured and unstructured text representations to train models such as natural language processing and database de-duplication models. This allows for the development of models capable of generating structured text from unstructured inputs or vice versa. Additionally, the string match matrix data structure provides a mechanism for validating and auditing synthetic data generation tools. Moreover, the string match matrix data structure enables the scalability of artificial intelligence training and model development by comparing the relationships captured in the matrix to those produced by synthetic data generators, allowing developers to fine tune and assess the quality and accuracy of artificially created training data sets.

Alternative uses of the string match matrix data structure may include natural language understanding tasks, information retrieval systems, and automated document classification. The structure's ability to capture semantic relationships between different textual representations makes it a versatile tool for a wide range of text processing and analysis applications. Furthermore, the string match matrix data structure can be dynamically updated and expanded as new textual data becomes available, allowing for continuous improvement of AI models and data analysis capabilities.

As used herein, numerical qualifiers for terms (e.g., "first document", "second document", etc.) are used in the relative sense to distinguish multiple versions of the same term within the particular example given. The qualifiers may be interchangeable, and any description associated with the underlying term (e.g., "document") elsewhere in the specification applies equally regardless of the qualifier unless indicated otherwise. For example, a particular embodiment may describe a "first document" as having certain properties and a "second document" as having different properties. In another example, a "second document" may have the properties of the "first document" from the preceding example, and vice versa. Moreover, descriptions of the properties of "documents" may apply to both the "first document" and the "second document" unless indicated otherwise.

Example System Architecture

Embodiments of the present disclosure may be implemented in various ways, including as computer program products that comprise articles of manufacture, as hardware, including circuitry, configured to perform one or more functions, and/or as combinations of specific hardware and computer program products. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may be implemented as one or more methods, apparatuses, systems, computing devices (e.g., client devices, servers, etc.), computing entities, and/or the like. As such, embodiments of the present disclosure may take the form of an apparatus, system, computing device, computing entity, and/or the like executing instructions stored on one or more computer-readable storage mediums (e.g., via the aforementioned software components and computer program products) to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams, flowchart illustrations, and other example visualizations. It should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. In the embodiments in which specific hardware is described, it is understood that such specific hardware is an example embodiment and may work in conjunction with one or more apparatuses or as a single apparatus or combination of a smaller number of apparatuses consistent with the foregoing according to the various examples described herein. Accordingly, the block diagrams and flowchart illustrations support various combinations of embodiments for performing the specified instructions, operations, or steps. Example systems that can be used according to examples herein are described with respect to FIG. 1, and FIG. 2.

Example System

FIG. 1 illustrates an example system 100 for use with embodiments of the present disclosure. As depicted, the example system 100 includes a client system 101, a document database system 120, and one or more external entities 140. The client system 101 may include a multimodal embedding-based analytical engine 108 and one or more AI systems 130. System 100 may enable, among other functions, enhanced string match matrix generation, AI based training and validation, and corresponding content remediation according to the various embodiments discussed herein.

The depicted client system 101 is a computing environment or set of one or more devices or hardware implementation that a user can use to interact with data, applications (such as a multimodal embedding-based analytical engine 108), and/or a network. Examples of client system 101 include, but are not limited to, a cell phone, smartphone, tablet, personal computer, laptop, server, cloud-hosted client, or the like. The client system 101 may be any device or group of devices via which a user can access the multimodal embedding-based analytical engine 108 (which may be local or remote) to interact with various features of an enhanced string match matrix environment facilitated by the client system 101. The client system 101 may include combinations of hardware and software configured to perform the specific functions described herein.

The client system 101 may additionally include a user interface via which the user can interact with the multimodal embedding-based analytical engine 108, for example. Such a user interface can include interactive graphical elements or components used to display data as provided by multimodal embedding-based analytical engine 108 or other components. In some embodiments, a user interface is configured to provide one or more interactive elements via which a user can interact with the displayed data. Such a user interface can be configured to be used, rendered, or downloaded to a user device or client device (e.g., rendered to one or more display screens).

As depicted, the client system 101 includes a multimodal embedding-based analytical engine 108. The multimodal embedding-based analytical engine 108 may include one or more components configured to achieve one or more aspects described herein, such as for enhanced string match matrix generation, AI based training and validation, and/or corresponding remediation in accordance with at least some embodiments of the present disclosure. In at least some embodiments, the multimodal embedding-based analytical engine 108 includes at least one prompt generation engine 110, at least one string generation engine 112, at least one vectorization engine 114, at least one comparison engine 116, at least one matrix generation engine 118, and at least one linking string generator 119. It should be appreciated that, though these engines or generators are depicted as distinct components with respect to FIG. 1, the functionalities provided by each component may be combined and provided by one single component, and/or various combinations/sub-combinations of the depicted components. In at least some embodiments, at least one prompt generation engine 110, at least one string generation engine 112, at least one vectorization engine 114, at least one comparison engine 116, at least one matrix generation engine 118, and at least one linking string generator 119 may be external to the multimodal embedding-based analytical engine 108 and/or client system 101 or may be used as part of the multimodal embedding-based analytical engine 108 and/or client system 101. In some embodiments, multiple components may be used for different versions of the described functions (e.g., multiple similarity detection engines for different document comparisons). In some embodiments, one or more components of the multimodal embedding-based analytical engine 108 and/or the application itself may operate as an autonomous agent.

A prompt generation engine 110 may be configured to generate one or more prompts for instructing one or more AI systems 130 or other components (e.g., the string generation engine 112). The prompt generation engine 110 may be configured to cause (or create a prompt to cause) the AI system(s) 130 to generate one or more synthetic strings in accordance with the various embodiments discussed herein. In some embodiments, the prompt generation engine 110 may generate a prompt fully or semi-autonomously from input (e.g., human input). In some embodiments, the prompt generation engine 110 may receive human input for instructing the AI systems. In some embodiments the human inputs (or other inputs) may bypass the prompt generation engine 110 and be directly fed into one or more of the AI systems as prompts. In some embodiments, the prompt generation engine 110 may comprise an AI system itself or may interact with an AI system (e.g., one or more of the depicted AI systems 130) to generate the prompts. In some embodiments, the prompt generation engine 110 may include one or more algorithmic and/or pre-stored non-generative processes for generating a prompt.

In at least some embodiments, the prompt generation engine 110 is configured to receive a document generation contextual construct to facilitate the generative AI prompting with specific data and/or instructions. In some embodiments, the document generation contextual construct may comprise one or more desired document features and/or additional contextual information configured to cause an AI system to generate one or more synthetic documents or portions thereof (e.g., synthetic strings and substrings). The prompt generation engine may be configured to generate prompts configured to instruct the one or more AI systems 130 to generate documents based on the document generation contextual construct. In at least some embodiments, the prompt generation engine is configured to receive and process user input indicating a desired function or purpose for a document, translate the user input (via natural language processing techniques, for example) into one or more document generation contextual constructs according to which prompts can be generated, and subsequently generate one or more AI prompts. In some embodiments, the prompt generation engine 110 may be configured to receive one or more input types, including other documents or portions thereof configured to cause the prompt generation engine to generate one or more outputs. In at least some embodiments, such as those where the multimodal embedding-based analytical engine 108 or portions thereof are configured with specific instructions for interfacing with at least one of the one or more AI systems 130, the prompt generation engine may be configured to generate prompts which comply with said specific instructions associated with the at least one of the one or more AI systems. The prompt generation engine may be a component configured to enable a user to instruct the AI systems 130 to generate documents according to a defined purpose or instruction.

In some embodiments, the prompt generation engine 110 may comprise or connect to one or more AI models (e.g., generative AI models) configured to generate prompts based on available context (e.g., document generation contextual construct, a source document or portion thereof, a configuration file, any other user or computer generated instruction, or the like). In some embodiments, the prompt generation engine may receive, as an input, a source document and a document generation contextual construct. The prompt generation engine may then parse the source document based on instructions in the document generation contextual construct to generate one or more document generation prompts based on one or more document generation contextual constructs associated with the document generation contextual construct. For example, a source document may include document strings (e.g., structured or unstructured strings) associated with a component and a document generation contextual construct may comprise a configuration file or other preferences and instructions for structured-unstructured string conversion to cause the prompt generation engine to parse (e.g., using natural language processing) the unstructured strings and generate a prompt to create one or more (e.g., structured) synthetic strings based on the (e.g., unstructured) document strings. The document strings and the prompt may then be passed to the string generation engine to generate the synthetic strings. The prompt generation engine 110 may be configured to (i) generate one or a set of document generation prompts using a document generation contextual construct and/or one or more additional inputs described herein, (ii) provide the set of document generation prompts as input into the one or more AI systems 130 to facilitate generating one or more documents (e.g., either by using the one or more AI systems 130 directly or by aggregating results received from the one or more AI systems 130). In some embodiments, the prompt generation engine 110 may include one or more temperature settings (e.g., as defined by a configuration file) that influence the generated prompts. In some embodiments, one or more of the prompts may be hard coded or templatized (e.g., rather than AI generated or at least purely AI generated). While described as a separate component, the prompt generation engine may define one or more pre-processing layers of one or more other components in some embodiments.

String generation engine 112 may be configured to parse a document, such as a structured or unstructured source document (or structured and/or unstructured portions of a source document) and/or a synthetic document into a collection of strings, substrings, or tokens associated with the foregoing that can be used for analysis, comparison, or processing. In at least some embodiments, string generation engine 112 is configured to parse a document's text into discrete string-based units (e.g., sets of strings and/or substrings). In at least some embodiments, string generation engine 112 is configured to remove formatting and normalize the document content, thereby supporting and simplifying computational analysis.

String generation engine 112 may be configured to leverage tokenization techniques with respect to a synthetic document and/or a source document. In such embodiments, the string generation engine may be configured to break a document's text, such as a sentence, phrase, or the like, into individual words or phrases. In at least some embodiments, string generation engine 112 is configured to leverage n-grams techniques, in which a document's text is split into overlapping sequences of n words. Similarly, string generation engine 112 may be configured to utilize shingling techniques, which effectively refer to n-grams for detecting overlaps in longer text spans. String generation engine 112 may be configured to leverage character n-grams techniques, according to which a document's text is broken into sequences of n characters. Further yet, string generation engine 112 may be configured to split the document into sentence strings or phrase strings. In some examples, one or more of the documents are formatted using XML or another markup language. The tags or other delimiters within the markup language may be used to break apart a document into strings or sub-strings.

String generation engine 112 may be configured to process the contents of a document to generate a set of strings associated with the document. The document may be a synthetic document or source document and may contain structured and/or unstructured strings. The strings may be divided into one or more sets of substrings and/or organized into one or more groupings of strings. In at least some embodiments, string generation engine 112 is configured to generate one or more subsets of strings from a portion of a document. For example, the string generation engine 112 may process a structured document or structured portion of a document to generate a second document string subset from a set of strings corresponding to the document. In some instances, the remaining strings of the document may be structured or unstructured. The structured strings may be numbered or otherwise organized hierarchically. In some embodiments, the structured strings may further be divided into substrings.

The string generation engine 112 can generate strings in any of a variety of ways. In an example, the string generation engine 112 receives the file path of a document as input (e.g., a local or remote location) and parse the document at that file path into a set of strings. This can be done by roughly chopping the document into strings of at most a certain number of characters. In addition or instead, strings can be created by splitting the file on delimiters, such as characters (e.g., periods indicating the end of a sentence), special characters (e.g., new line breaks or paragraph breaks), or tags. In addition or instead, various file parsing libraries can be used, such as NLTK or SPACY, which use natural language processing to tokenize large blocks of text (e.g., as may be found in a document) into smaller portions (e.g., strings). In some examples, the document includes images in addition to text. In some implementations, the images are ignored. In other instances, the images can be converted into a text description by the string generation engine 112 (or another program called by the string generation engine 112). The text description of the image can form one or more strings.

Vectorization engine 114 may be configured to convert one or more strings into numerical vectors or arrays of numbers. In at least some embodiments, vectorization engine 114 transforms raw text or natural language (e.g., both structured and unstructured natural strings) into numerical formats understandable/usable by one or more machine learning models by embedding the strings as vectors in vector space. Vectorization engine 114 may be configured to transform the output of the string generation engine 112 (e.g., sets of strings and substrings, both structured and unstructured) into a fixed-size or variable-size numerical representation as a vector. In at least some embodiments, vectorization engine 114 is configured to leverage techniques such as one-hot encoding, bag of words (BoW), TF-IDF, word embeddings, or transformer-based encodings. One hot encoding refers to utilization of a binary vector where only the index for a subject word is "1". Bag of Words techniques count the number of word occurrences in a string/document. TF-IDF techniques weigh word frequency inversely by how common a word is across a string/document. Word embedding techniques may be configured to use pretrained vectors that capture semantic meaning (Word2Vec, for example). Similarly, sentence embeddings convert entire sentences or strings into a dense vector. Transformer-based vectors leverage models such as BERT or GPT to create contextual embeddings. In at least some embodiments, vectorization engine 114 is configured to transform strings (including substrings, both structured and unstructured) into dense-fixed length numerical vectors in a high-dimensional vector space, such that similar inputs are mapped to nearby points in that space. Vectorization engine 114 may be configured to transform a set of strings (including substrings) into a set of embeddings. When comparing strings and/or substrings, each set may be separately vectorized for comparison in vector space. The vectorization engine 114 is configured to convert strings/substrings/string contents into numerical vectors preserving structure, meaning, or frequency enabling computation and modeling.

Comparison engine 116 may operate in vector space or elsewhere and may be configured to determine similarity levels between two or more selected sets of embeddings, including generating a similarity score, performing embedding comparison to generate embedding similarity value, and determining whether two or more sets of embeddings satisfy one or more similarity conditions using a embedding similarity algorithm. In at least some embodiments, the comparison engine 116 is configured to compare a first set of embeddings (e.g., embeddings associated with structured strings) and a second set of embeddings (e.g., embeddings associated with unstructured strings) to determine a similarity associated with a set of similarity conditions (e.g., a first similarity associated with a first set of similarity conditions for a first pair of embeddings, a second similarity associated with a second set of similarity conditions for a second pair of embeddings, etc.). The comparison engine 116 may be configured to use the same similarity conditions for multiple embedding comparison processes and/or may use different similarity conditions when comparing different embeddings. The comparison engine 116 may be configured to evaluate a numerical similarity between a plurality of embeddings to determine how closely their underlying inputs are in meaning, structure, and/or context. The comparisons can be performed in any of a variety of ways including using cosine similarity, kernel methods, Euclidian distance, other techniques or combinations thereof. In some examples, an artificial intelligence model is trained to return a similarity value based on two inputs (e.g., locations in vector space).

The one or more AI systems 130 may be systems configured to use artificial intelligence techniques, such as an AI model comprising one or more large language models, to write or assist in writing one or more strings associated with a document. One or more of the AI systems 130 may be trained on selected sets of existing documents and corresponding natural language (e.g., structured and/or unstructured strings), or may otherwise be seeded on selected sets of existing documents (e.g., via inputting the selected sets of existing documents or using retrieval augmented generation to retrieve the sets of existing documents), thereby enabling them to generate documents based on received inputs including partially written content, natural language prompts, and/or desired function descriptions, in each instance whether human generated or generated by the prompt generation engine 102.

Though the one or more AI systems 130 are depicted as separate from the multimodal embedding-based analytical engine 108, embodiments exist in which one or more AI systems are incorporated as components of the multimodal embedding-based analytical engine 108 and/or separate from the client system 101. In some embodiments, respective AI systems of the one or more AI systems 130 may be instantiated in different respective systems (e.g., some part of the client system 101 and others external to the client system). In at least some embodiments, client system 101 is configured to cause one or more AI systems to generate a synthetic document or a synthetic document set according to the prompts by interacting/interfacing with a chatbot of an AI system, for example, to issue one or more prompts to the respective AI system. In some embodiments, the synthetic document may comprise structured strings (including substrings) and/or may include unstructured strings. The synthetic document may be generated based on source documents and/or other prompts (e.g., "generate a synthetic, structured string set based on the unstructured strings in the attached source document" or "generate a synthetic, unstructured string set based on the structured substrings in the attached source document").

Figure 8:
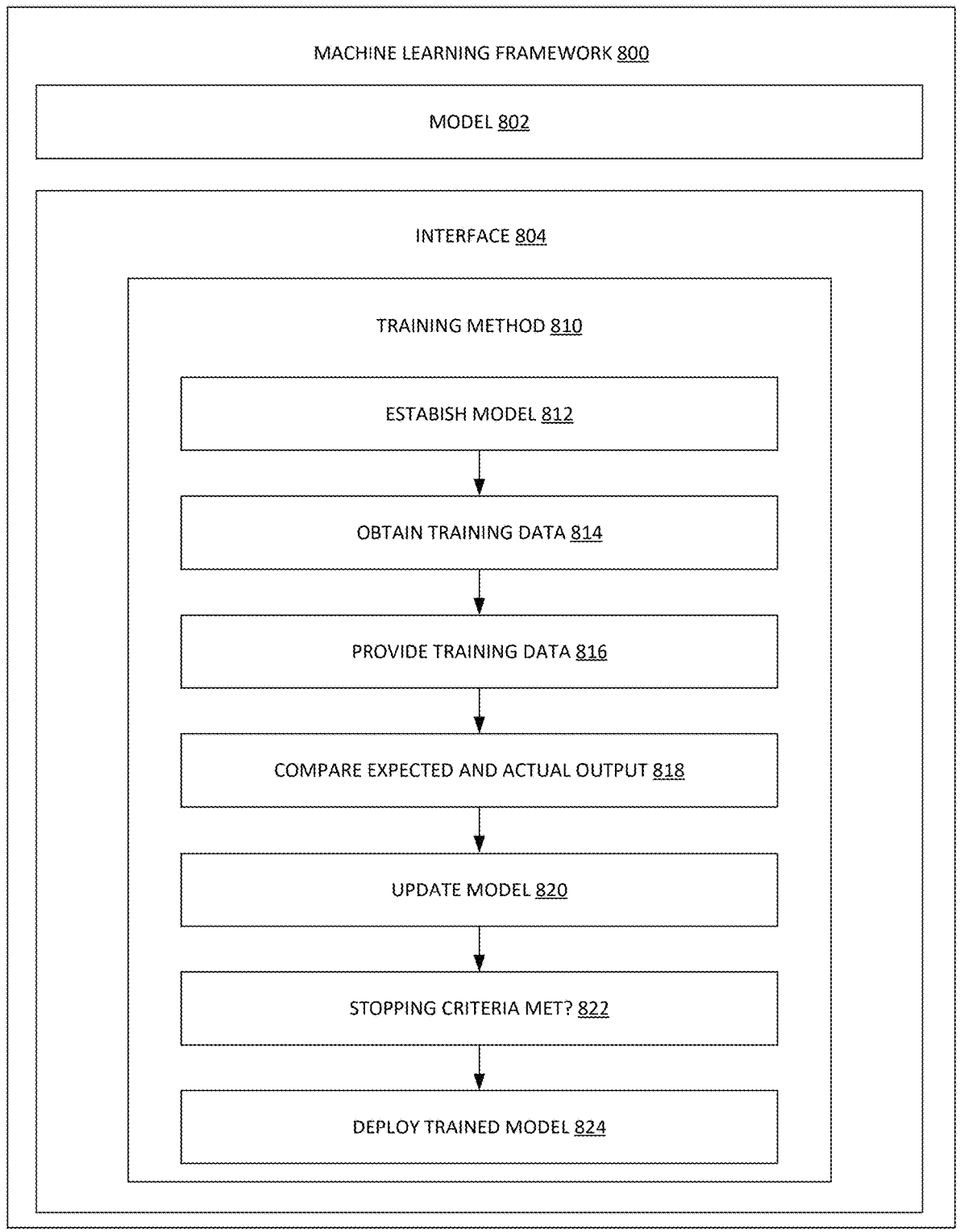
FIG. 8 illustrates an example machine learning framework for use with embodiments of the present disclosure.

The AI systems 130 may include or may be in communication with one or more subsystems to facilitate their operation, which may include a training engine 132, validation engine 134, and/or execution engine 136 for respectively facilitating training, validation, and execution of the various AI based functions associated with the systems. The respective engines 132, 134, 136 may comprise software or software enabled by hardware (e.g., processing circuitry 302 illustrated in FIG. 3) to configure them to perform their respective functions. Although depicted as individual engines within an AI system 130, the respective engines 132, 134, 136 may be part of a centralized system configured to direct all AI systems. In some embodiments, the respective engines 132, 134, 136 may be part of one or more other components or portions of the AI systems and may share at least some hardware. In some embodiments, the training engine 132 may be configured to track training data for one or more respective AI models, and execute one or more training algorithms to train or update the training of the AI models (e.g., as shown in FIG. 8). In some embodiments, the validation engine 134 may be configured to validate performance of the trained model, such as by using the string match matrix to compare expected versus actual performance. In some embodiments, the execution engine 136 may be configured to receive one or more inputs and apply the input(s) to the trained AI model of the AI system 130 to generate an output.

The set of one or more document database systems 120 may each be a computing location associated with a system where one or more document repositories 152 (e.g., a set of repositories 150) comprising documents are stored, accessed, modified, and otherwise maintained by the system. A document database system 120 and one or more document repositories 152 therein may be used to store documents in association with a data storage protocol and/or a query language. In some embodiments, the document database system 120 may comprise a distributed access document database system. In certain embodiments, a document database system 120 may embody a data storage device or devices, a separate database server or servers, or as a combination of data storage devices and separate database servers. Further, in some embodiments, a document database system 120 may be embodied as a distributed database such that some of the stored data is stored centrally in a location within the repository and other data stored in a single remote location or a plurality of remote locations. Alternatively, in some embodiments, a document database system may be distributed over a plurality of remote storage locations only such as in a cloud storage environment. In some embodiments, one or more of the document repositories 152 of the set of document repositories 150 may be accessible by the public in whole or in part (e.g., via API or other interface associated with the document database systems 120). In some embodiments, two or more document repositories 152 may be stored in different document database systems 120 and accessed by querying the respective systems or otherwise receiving data from the respective systems. In some embodiments, all of the document repositories 152 may be stored in a single document database system 120.

The one or more external entities 140 may each be a computing entity distinct from client system 101. The external entities 140 may include the repositories 150 and/or one or more AI systems 130 in some embodiments. In at least some embodiments, the one or more external entities 140 are entities which have contributed one or more documents to the repositories and/or control editing or use of one or more of the documents in the repositories. With respect to the embodiment depicted, external entities 140 may be configured to receive communications from client system 101, and the external entities 140 may provide data to one or more repositories or interact with the client system and/or document database system 120 regarding various provisions, privileges, and/or one or more detected duplication errors.

Figure 2:
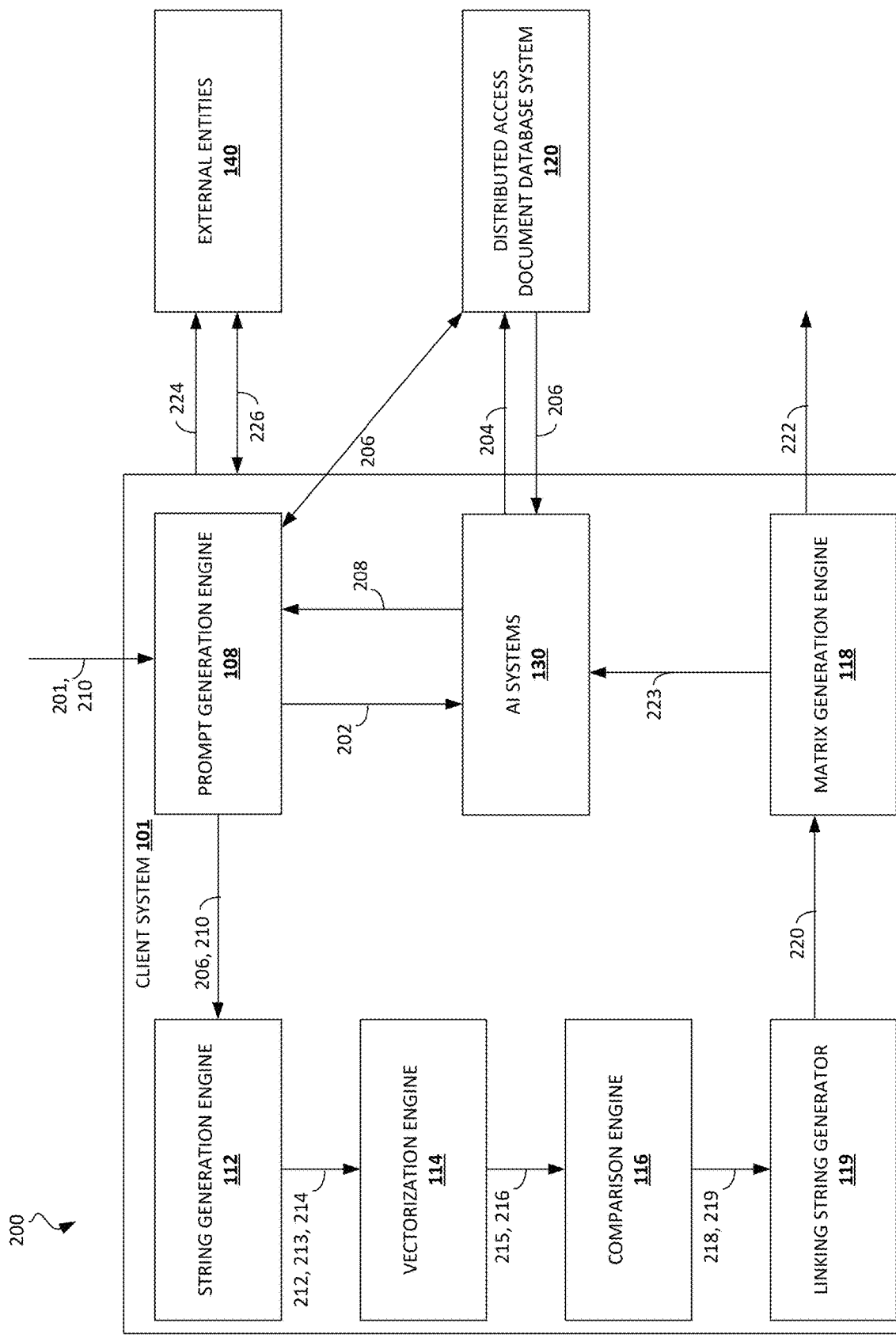
FIG. 2 illustrates a flow diagram showing the interaction of an example system in accordance with at least one embodiment of the present disclosure.

FIG. 2 illustrates dataflow within an enhanced string match matrix environment 200 configured in accordance with at least some example embodiments of the present disclosure. The system components illustrated in FIG. 1 may be configured to perform the various functions and generate, modify, access, and otherwise interact with the various components of the depicted enhanced string match matrix generation environment 200. As depicted, the enhanced string match matrix environment 200 includes client system 101, string generation engine 112, vectorization engine 114, comparison engine 116, matrix generation engine 118, linking string generator 119, document database system 120, AI systems 130, and external entities 140. The enhanced string match matrix environment 200 may, among other improvements, enable generation of an enhanced string match matrix with respect to a plurality of documents, improved training and validation of one or more AI models, and remediation of a duplication error in the plurality of documents.

In an instance in which the systems are configured to generate synthetic strings for synthetic documents, as depicted, client system 101 receives a document generation contextual construct 201. The document generation contextual construct 201 may include a specific objective or component (e.g., a "purpose") that a synthetic document or other content to be generated is intended to describe, define, or accomplish. The document generation contextual construct 201 may outline why a document exists and what information it is intended to provide. In the depicted embodiment, the document generation contextual construct 201 may be any version of the document generation contextual constructs described herein. In some embodiments, a document or other source strings may be provided with the document generation contextual construct(s) to facilitate generation of the synthetic document (including one or more synthetic strings). In at least some embodiments, the document generation contextual construct 201 may be a user-provided textual (or visual or verbal) description of a component to seed generation one or more documents. The component may include a single specific component or purpose, a class of components or purposes, or any other denomination of component or purpose. The document generation contextual construct 201 may further include context or other additional information about the document to be generated, such as a structure, format, language, or the like; about the document generation process (e.g., a number of prompts, number of AI systems, mix of prompts and AI systems, such as how many prompts per AI system); and/or about the downstream processes (e.g., the respective document repositories to review or a type of remediation requested). In some embodiments, one or more of the foregoing aspects of the document generation contextual construct may be predetermined (e.g., set prior to receipt of the document generation contextual construct 201 by a configuration file or similar setting) and/or may be open ended (e.g., such that a whole class of the respective datum is investigated). In some embodiments, the document generation contextual construct 201 may be inferred from other data and/or may be autonomously input into the enhanced string match matrix environment 200. In such embodiments, the document generation contextual construct 201 may be provided via a user interface of a client device, using one or more input mechanisms providing text input capabilities and/or voice to text capabilities, for example. The document generation contextual construct 201 may comprise a description of one or more functions, goals, features, or other purposes provided by a document.

In an example embodiment, the client system 101 may be configured to receive (e.g., from an internal service or process, from a user, or from an external system) a document generation contextual construct with a source document. The document generation contextual construct may instruct the client system 101 and thereby one or more engines and/or downstream systems to perform one or more functions with respect to the source document. For example, in an instance in which the source document comprises structured strings with one or more substrings, the document generation contextual construct may prompt an AI system 130 to generate one or more synthetic unstructured strings and may cause the system 101 to search for one or more corresponding documents comprising strings satisfying a similarity condition with respect to the synthetic unstructured strings. By way of another example, in an instance in which the source document comprises document strings, the document generation contextual construct may prompt an AI system 130 to generate one or more synthetic structured strings and may cause the system 101 to search for one or more corresponding documents comprising structured strings satisfying a similarity condition with respect to the synthetic unstructured strings.

Client system 101 may be configured to provide a set of prompts 202 to one or more AI systems 130 (e.g., for generating one or more synthetic documents and/or analyzing one or more documents in accordance with the embodiments of the present disclosure). The set of prompts 202 may be generated or provided by a prompt generation engine of client system 101 based on the document generation contextual construct 201. In some embodiments, the prompts may be manually generated or prestored in association with a larger process flow (e.g., a prompt to generate a synthetic string based on a source document prior to searching for similar strings in one or more stored documents using the synthetic strings), which larger process flow may be initiated autonomously or in response to user selection or other input. In some embodiments, the set of prompts 202 may be partly or entirely autonomously generated (e.g., in response to receipt of the document generation contextual construct 201).

The set of prompts 202 may include one or more document generation prompts configured to instruct an AI system (e.g., via the one or more generative AI models associated with such an AI system) to generate a document that fulfills a specific task or requirement associated with the document generation contextual construct 201 (e.g., generating a synthetic document based upon an input string or strings). Up to each prompt of the set of prompts 202 may be a structured or unstructured input, written in natural language and/or combined with component snippets or technical specifications defining a document generation request for the one or more AI systems 130. In at least some embodiments, a prompt of the set of prompts 202 includes any of a description of a desired document behavior or functionality, features, constraints or edge cases to consider and/or avoid, input and output examples, desired frameworks, and/or style or formatting preferences. In at least some embodiments, up to each prompt of the set of prompts 202 may be generated specifically for use with a specific AI system of the one or more AI systems 130, such that a respective prompt is provided in a format which is readily usable with respect to said specific AI system. Some example processes according to the present disclosure may use a single prompt 202 applied to one or more AI systems 130. Other example processes according to the present disclosure may use multiple prompts applied to one or more AI systems 130 (e.g., (i) the same prompt applied to multiple AI systems, (ii) the same prompt applied to the same AI system multiple times, and/or (iii) different prompts applied to the same and/or different AI systems).

The one or more AI systems 130 may include one or more generative AI models capable of providing basic document building blocks responsive to the set of prompts 202, an accompanying document or set of strings associated with a document, and/or the document generation contextual construct 201. An individual AI system of the one or more AI systems 130 may include a generative AI model with or without additional algorithmic functionality, with the generative AI model configured to learn patterns from training data and generate new outputs. In at least some embodiments, the one or more AI systems 130 includes any of transformers, variational autoencoders, generative adversarial networks, diffusion models, autoregressive models, and the like. The one or more AI systems 130 are configured to receive one or more of the set of prompts 202 based on to the document generation contextual construct 201, and generate one or more a synthetic documents based thereon.

One or more document repositories (shown in FIG. 1) may be stored in one or more document database systems 120 (e.g., distributed access document database systems) where documents for one or more heterogeneously privileged document sets (e.g., documents stored in various repositories within the database system(s) having different privileges) is accessible to at least the client system 101 or an intermediate system providing the source document (e.g., publicly available or available to at least multiple entities), thereby allowing users to view, download, use, and, in some instances, contribute to documents via the repository(ies). In some embodiments, synthetic, generated documents (e.g., sets of strings and substrings, whether structured or unstructured) may be stored in one or more of the repositories for future access and use. In some embodiments, the one or more heterogeneously privileged document sets retrieved from the one or more repositories may be selected based on the document generation contextual construct 201 to limit the test population (e.g., querying the repository(ies) for documents directed to the purpose or general function associated with the document generation contextual construct 201). In some embodiments, all of the documents in one or more selected repositories may be retrieved for analysis.

In at least some embodiments, the set of prompts 202 may include prompts configuring or causing the AI systems 130 to query a document database system 120 for one or more documents, including documents used for or meeting the requirements of a document generation contextual construct, documents for training one or more of the AI systems, and/or documents for the various comparison and string match matrix generation processes discussed herein. In at least some embodiments, such as those where the set of prompts correspond to queries rather than document generation prompts, client system 101 may be configured to query document database system 120 absent intermediary intervention by the AI systems 130.

As depicted, the AI systems 130 (or another part of the client system 101) may be configured to issue a query 204 (or other search function) to document database system 120. In at least some embodiments, query 204 may be configured to query one or more repositories of the document database system for one or more existing documents/document subsets 206 (e.g., documents satisfying the requirements associated with the document generation contextual construct 201 or other query), either partially or completely. In at least some embodiments, the AI systems 130 are configured to query the document database system for one or more documents based on which the AI systems 130 will generate a synthetic document 208. For example, the AI systems 130 may be configured to generate synthetic document 208 based on features of the one or more existing documents/document subsets 206 (e.g., in an instance in which a document name and/or location is identified for the system to retrieve rather than being provided with the prompt) such that synthetic document 208 substantially satisfies the requirements associated with the document generation contextual construct 201. In some embodiments, one or more source documents may be stored in one or more of the repositories for subsequent retrieval. In some further embodiments, the document database system 120 may include systems accessible via the Internet, including third party websites and databases.

In at least some embodiments, such as those where client system 101 and/or AI systems 130 are configured to issue prompts to query document database system 120 for an existing source or synthetic document (rather than generate a document, for example), the AI systems 130 may be configured to generate one or more prompt variations based on the set of prompts 202 for querying the document database system 120 for an appropriate document. In at least some embodiments, the illustrated synthetic document 208 (whether generated by an AI system or retrieved from a repository) is representative of a plurality of synthetic documents (e.g., previously generated and stored documents) which are generated/identified by AI systems 130 and/or client system 101 which satisfy the requirements associated with the document generation contextual construct 201. Similarly, one or more source documents may be identified by AI systems 130 and/or client system 101 which satisfy the requirements associated with the document generation contextual construct 201. In some embodiments, documents may be retrieved from one or more repositories by recursively accessing sub-domains (e.g., hyperlinks in a website embodiment) within one or more domains, and associating each sub-domain with a respective document of the first set of documents.

In at least some embodiments, the AI systems 130 are configured to generate a synthetic document based on a plurality of identified documents, files, and other content items identified within the document database system 120 and/or otherwise provided to the respective AI system (e.g., provided with the user's input). Synthetic document 208 may be an AI-generated aggregation of the plurality of identified content items associated with the source document 210 and/or the document creation context construct 201. For example, synthetic document 208 may be an aggregation of a plurality of content items associated with a component indicated by source document 210.

The systems may be configured to compare two documents and generate one or more string match matrix data structures based on the comparison. In some embodiments, client system 101 may be configured to input two documents into a string generation engine 112 to initiate or produce data for a comparison of the documents by breaking the documents down into respective strings and/or substrings. In some embodiments, the strings may be extracted by isolating a portion of the document or confirming that the whole document comprises relevant strings. Some embodiments may include dividing the strings into substrings or otherwise identifying relevant portions of the set of strings for each respective document. In some embodiments, the strings may be pre-generated and the string generation engine 112 may be skipped.

In the depicted embodiment, two documents are input into the string generation engine 112: the first document 210, which is input into the system (e.g., as an entire document or via providing a file path or uniform resource identifier associated with the first document), and a second document 206 that is retrieved from the document database system 120. The documents 206, 210 may be obtained, provided, and/or generated from any source in some embodiments. In the depicted embodiment, each document 206, 210 is a source document having document strings (e.g., one comprising structured strings and structured substrings and the other comprising unstructured strings for comparison). String generation engine 112 may be configured to process the contents of first document 210 to generate a first document string set 212 associated with the first document. Similarly, string generation engine 112 may be configured to process the second document 206 to generate a second document string set 213 associated with the second document 206. In the present example, the first document 210 comprises first document strings (e.g., unstructured sequences of natural strings comprising natural language) and the second document comprises at least second document strings (e.g., structured strings divisible into a plurality of structured substrings) and may also include additional second strings. In some examples, the second document includes second document first text content, second document second text content, and second document image content (e.g., which can be described using strings).

In some embodiments, the string generation engine 112 is further configured to generate a second document string subset 214 (e.g., numbered or otherwise ordered, structured strings), and divide the second document string subset 214 into a plurality of substrings. In some examples the string generation engine 112 is configured to identify a second document second text content region of the second document distinct from a second document first text content region and generate the substrings based on the second document second text content region. In some examples, the second document second text content region is broken into substrings using a second parameter (e.g., delimiter) different from a first parameter (e.g., delimiter) used to create the second document strings.

In some embodiments, the string generation engine 112 may further comprise one or more intermediate layers or routines configured to divide at least a subset of a document comprising structured strings into second document substrings and/or to generate one or more synthetic substring sets of synthetic substrings. String generation engine 112 may be configured to provide the first document string set 212, the second document string set 213, and/or the second document string subset 214 to vectorization engine 114.

In some further embodiments, prior to vectorization, the system may be configured to generate a synthetic substring set of synthetic substrings. In such embodiments, the second document substrings or second document strings may be transformed into a synthetic substring set by augmenting respective ones of the second document substrings with context extracted from other regions of the second document (e.g., other substrings) to generate the synthetic substrings (e.g., second document synthetic substrings). In an example, generating the synthetic substring set of synthetic substrings includes performing actions for each respective second document substring of the second document substrings. The actions can include, for example, synthesizing first, second, and third related content from the second document first text content, second document second text content, and the second document image content (respectively) based on relevance to the respective second document substring. In an example, a respective synthetic substring is generated by providing the first, second, and third related content (or a prompt based thereon) as input to the multimodal generative artificial intelligence model. One or more of the synthesizing steps can be performed using, for example, one or more multimodal generative artificial intelligence models.

The context may be based on a feature type, common word or phrase, common component portion or component, or other attribute associated with the respective ones of the second document substrings as determined, for example, by a classifier run on each substring. The system may then input the synthetic substrings into the vectorization engine 114.

In some embodiments, vectorization engine 114 is configured to process (e.g., embed) the respective inputs strings from each document (e.g., the first document string set 212, second document string set 213, the second document string subset 214, the second document substrings, and/or the synthetic string set) to provide one or more sets of embeddings, such as a first document embeddings 215 associated with the first document, second document embeddings 216 associated with the second document, and synthetic embeddings associated with the synthetic strings or substrings. The vectorization engine 114 may utilize an embedding function with respect to input strings to generate the first set of embeddings 215 and the second set of embeddings 216. Vectorization engine 114 may be configured to provide the generated sets of embeddings (e.g., the first document embeddings 215 and the second document embeddings 216) to comparison engine 116.

Comparison engine 116 may be configured to compare the first document embeddings 215 and the second document embeddings 216 in vector space. In at least some embodiments, comparison engine 116 is configured to leverage one or more embedding comparison techniques (e.g., a embedding similarity algorithm comparing the vectors in vector space as discussed herein) to determine a plurality of embedding similarity values. For example, the comparison engine 116 may be configured to determine a cosine similarity between embeddings. In some examples, the comparison engine 116 directly or indirectly is used to produce closest embedding sets. For example, a closest embedding set can include each of the first document embeddings that have an embedding similarity value to the respective synthetic embedding that satisfies a predetermined similarity value threshold. In the depicted example, two documents (e.g., one comprising structured strings and one comprising at least unstructured strings) may be compared in vector space using the comparison engine 116. In some embodiments, any two documents, subsets of documents, strings, and/or substrings may be compared using the comparison engine 116 (e.g., two structured string sets, two unstructured string sets, or various other combinations discussed herein).

In one implementation, generating the closest embedding set includes performing various actions for each respective synthetic embedding of the synthetic embeddings. The actions may include comparing in the vector space using an embedding similarity algorithm the respective synthetic embedding with each respective first document embedding of the first document embeddings to generate embedding similarity values. Each respective embedding similarity encoding a quantitative expression of similarity between the respective synthetic embedding and a respective first document embedding. Then, a closest embedding set is formed that includes each of the first document embeddings that have an embedding similarity value to the respective synthetic embedding that satisfies a predetermined similarity value threshold.

In at least some embodiments, comparison engine 116 is configured to normalize embeddings. In such embodiments, comparison engine 116 may be configured to determine a dot product to reflect a magnitude-aligned similarity between a first embedding (e.g., of the first document embeddings) and a second embedding (e.g., of the synthetic embeddings). Comparison engine 116 may be configured to determine a Euclidean distance between a first embedding and a second embedding, such that larger values for the Euclidean distance indicate a higher dissimilarity the embeddings. In at least some embodiments, comparison engine 116 is configured to determine a Manhattan distance between a first embedding and a second embedding by calculating the sum of absolute differences between the embeddings. In at least some embodiments, comparison engine 116 is configured to identify a closest embedding set based on the plurality of embedding similarity values, wherein the closest embedding set corresponds to one or more strings or portions thereof from the first document string set that most closely match each of the second document substrings of the structured strings (e.g. the second document string subset) of the second set of strings. In at least some embodiments, comparison engine 116 is configured to provide embedding similarity values 218 to a matrix generation engine 118 and/or linking string generator 119. The plurality of embedding similarity values 218 may additionally include an indication of the closest embedding set 219. In some implementations, both documents are converted into synthetic documents so as to take into account their respective contexts and are then used for the comparisons.

In some embodiments, the comparison engine 116 may use a threshold of similarity to generate the closest embedding sets (e.g., all strings associated with the first document embeddings that are within a predetermined similarity threshold to a respective substring embedding associated with the synthetic embeddings may be included in the closest embedding set) in a one-to-many configuration. In some embodiments, matches may be determined on a string-by-string basis (e.g., a string of the first document may match one string of the structured strings of the second document but not another), on a substring-by-substring basis, and/or on a document (e.g., full structured string set) basis. In some embodiments, the comparison may be performed hierarchically, such that the primary (also referred to as a "root") structured string of the structured string set must match the first document but one or more structured strings that are dependent on the root structured string may not require a match or may not require as close of a match.

In some embodiments, the comparison engine 116 may include one or more failsafe thresholds configured to return an error or flag the comparison (or a particular portion of the comparison, such as an individual substring) if the comparison calculation is outside a predetermined threshold range of similarity. In some embodiments, the process may proceed without a closest embedding set for one or more of the second document substrings or the process may cease and revert to the user (e.g., with a summary of the missing substring match or another error or instruction message).

In some embodiments, a linking string generator 119 may be configured to receive the embedding similarity values 218 and/or the mappings of the closest embedding sets 219 from comparison engine 116 and the respective strings and substrings associated therewith.

The linking string generator 119 may be configured to generate a linking string 220 defining an association between each of the substrings of the second document string set and the corresponding one or more first strings of the first document string set for each closest embedding set. The linking string generator 119 generates at least one linking string 220 for each closest embedding set indicating portions of the first document and portions of the second document associated with the closest embedding set. The linking string generator 119 may comprise one or more generative AI systems or otherwise interface with one or more generative AI systems to generate natural language strings synthesizing and explaining the similarity and relevance of the respective substrings and strings from each document to each other. In an example, the linking string generator 119 takes as input the respective first and second document strings or substrings (synthetic or otherwise) from the closest embedding set and a prompt that instructs the linking string generator 119 to produce a description of how one relates to the other. In some examples, a wider context is provided to facilitate the generation of the linking string.

The linking strings generated by the linking string generator 119 may be stored in an array or another data structure with the respective closest embedding sets comprising a respective substrings and the one or more corresponding strings associated with the closest embedding set (e.g., with each row of an array or other data structure being associated with one respective substring, whether an original substring from the second document string subset or a synthetic substring generated in accordance with the embodiments discussed herein). These linking strings may be used for validation of the respective AI systems (e.g., confirming an accurate closest embedding set and link between the respective portions of the first document and second document) and for training or updating the training of one or more of the respective AI systems (e.g., inputs to provide context to train one or more layers of an AI model to link the respective structured and unstructured strings and/or to generate structured strings based on unstructured source documents or to generate unstructured strings based on structured source documents.).

Matrix generation engine 118 may be configured to receive one or more linking strings 220 from linking string generator 119 (e.g., in the depicted embodiment, at least one string per closest embedding set 219 associated with each of the second set of embeddings). In at least some embodiments, matrix generation engine 118 is additionally configured to receive any one or more of the plurality of embedding similarity values 218, the first document string set 212, the second document string set 213, the second document string subset 214, the second document substrings, the second plurality of synthetic substrings, the first document embeddings 215, and/or the synthetic embeddings 216 via any of string generation engine 112, vectorization engine 114, and/or comparison engine 116.

In at least some embodiments, matrix generation engine 118 is configured to generate a string match matrix data structure 222 comprising a plurality of substring rows. Up to each substring row of the plurality of substring rows may comprise, as an example, a first cell describing a first string associated with the first document (e.g., corresponding to the closest embedding set for each respective row), a second cell describing one or more corresponding respective portions of the second document (e.g., from which a substring or synthetic substring of the closest embedding set was created), and a third cell with a corresponding linking string that connects the contents of the first cell with the contents of the second cell. In some embodiments, one or more links, citations, or other datum indicative of a source location of each respective string may be included in the corresponding cells or in an adjacent cell. As depicted, matrix generation engine 118 may be configured to provide the string match matrix data structure 222, 223 to the AI systems 130 (e.g., for training and/or validation) and/or to the user interface or other receiving device or component.

In some embodiments, responsive to or based on generating the string match matrix data structure 222, the client system 101 can identify one or more duplication errors or lack of duplication errors associated with the first document and second document.

Based on the identified one or more duplication errors, the client system 101 may be configured to initiate one or more remediating actions 224 (e.g., with respect to the one or more external entities 140). In at least some embodiments, the one or more remediating actions 224 may be configured to remediate one or more identified duplication errors, including but not limited to by deletion of the duplicate document/document subset, hiding of the duplicate document/document subset, locking of the duplicate document/document subset, de-indexing or deprioritizing of the duplicate document/document subset in search results (e.g., such that the original document/document subset appears before the duplicate document/document subset in searches and/or the duplicate document/document subset does not appear), causing searches and/or links to the duplicate document/document subset to redirect to the source document/document subset, and/or granting or allocating privileges associated with the source document/document subset (e.g., to systems, parties, entities, users, or the like associated with the duplicate document/document subset). In some examples, the operator of the client system 101 may proactively communicate with another entity having the duplication error for confirmation regarding whether to proceed with the remediation. For instance, responsive to detecting the duplication error, a confirmation request regarding the duplication error can be transmitted. The confirmation request can include the string match matrix data structure, and requests confirmation regarding initiating a remediation action selected from the group consisting of: deletion of the first document, hiding the first document, locking the first document, de-indexing the first document from search results, deprioritizing the first document in search results, redirecting links to the first document to the second document, granting privileges associated with the second document, allocating privileges associated with the second document. Then, a response to the confirmation request can be received regarding the duplication error, and an action can be taken based thereon.

As suggested in the remediation processes described above, in some embodiments, the remediation actions may occur in one or more repositories, in an external entity system, in the client system 101, and/or in other computing systems, and may be triggered via transmission from another system (e.g., the client system) via API call, message, or the like. In at least some embodiments, the remediating actions 224 may be configured to communicate with one or more external entities 140 to obtain and/or allocate privileges 226 associated with the document/document subset or otherwise e remediate an unpermissioned document/document subset. Once the privileges are obtained by the client system 101, duplicate documents may be further remediated accordingly (e.g., deleted, hid, etc. as discussed above). In some embodiments, the client system 101 may grant privileges to or in association with the document/document subsets and/or the users or entities associated with the duplicate document/document subset.

In some embodiments, referring back to FIG. 1, the AI systems 130 may be trained or have their training updated based on the comparison between documents (e.g., via receiving the string match matrix 222, 223 as shown in FIG. 2). In such embodiments, in an instance in which a synthetic document is compared to a source document, the AI system may (e.g., via reinforcement learning) process the identified associations between strings in the string match matrix data structure and compare the associations with a predetermined association to confirm that the synthetic document was accurately generated based on the source document (e.g., via a validation engine). In an instance in which two source documents are compared (e.g., one structured and one unstructured), the AI system may be trained (e.g., via training engine) to predict a structured string or strings based on the unstructured string or strings or vice versa. For example, the two strings may be identified as a positive training pair, defining equivalent strings despite the difference in structural differences, which may then train one or more AI models to recognize and generate structured strings from unstructured strings and vice versa. The strings may be labeled (e.g., by the matrix generation engine).

The various components of FIG. 1 and/or FIG. 2 may be configured to communicate via a network, whether local and/or wide area, or whether at least partially within a computing device (e.g., via bus). The network may be a set of devices that facilitate communication from a sender to a destination, such as by implementing communication protocols. Example networks may include local area networks, wide area networks, private networks such as an intranet, public networks such as the Internet, or any combination thereof. The network may include any wired or wireless communication network including, for example, a wired or wireless local area network (LAN), personal area network (PAN), metropolitan area network (MAN), wide area network (WAN), or the like, as well as any hardware, software and firmware required to implement it (such as, e.g., network routers, etc.). For example, communications network may include a cellular telephone, an 802.11, 802.16, 802.20, or WiMax network. The network may utilize a variety of networking protocols now available or later developed including, but not limited to Transmission Control Protocol, Internet Protocol, etc.

Figure 3:
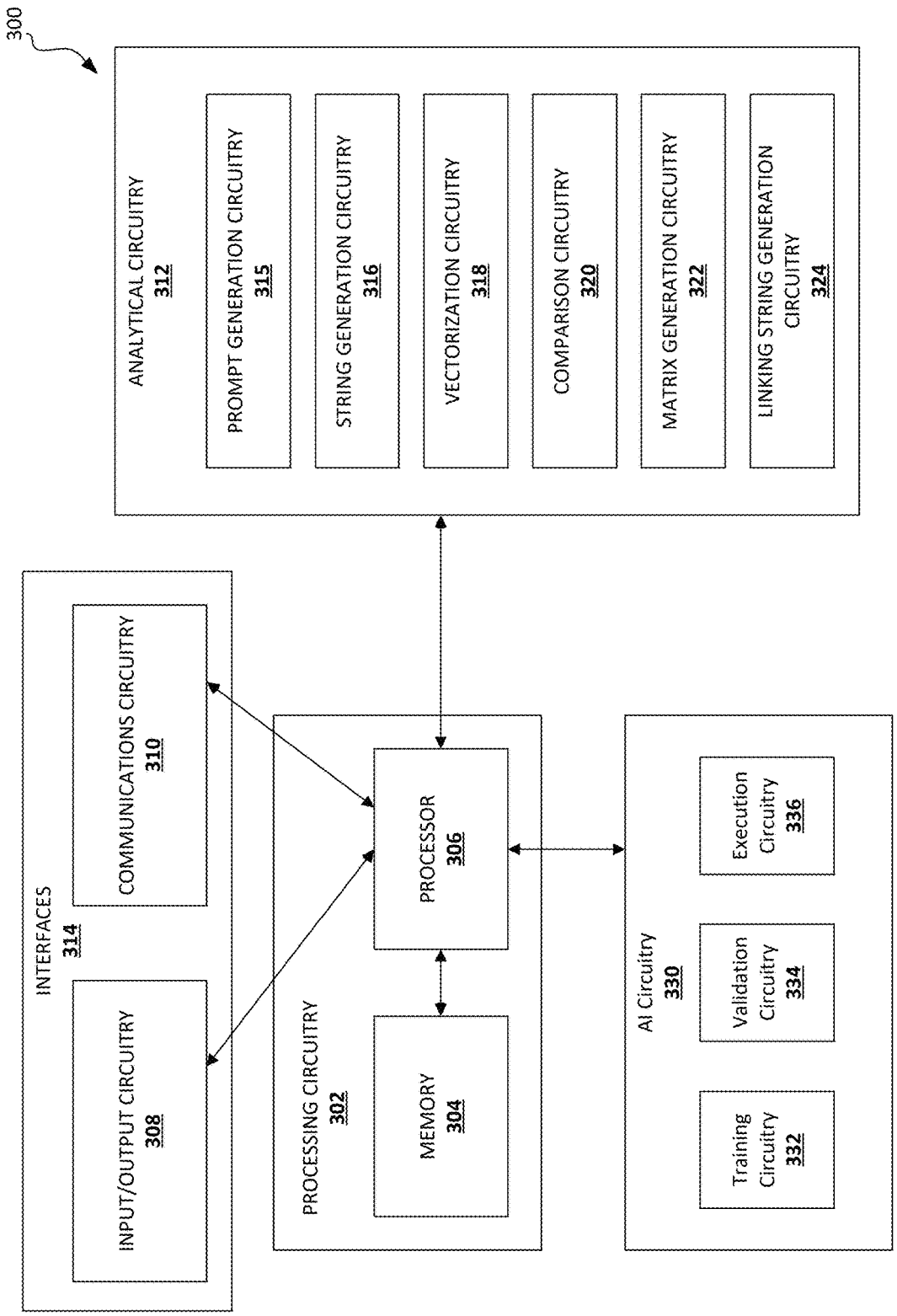
FIG. 3 illustrates an example apparatus configured in accordance with at least one embodiment of the present disclosure.

FIG. 3 illustrates a block diagram of an apparatus 300 in accordance with some example embodiments of the present disclosure. One or more apparatuses 300 may correspond to and be configured to perform the functions associated with the client system 101 shown in FIG. 1, for example, and may be configured to perform one or more of the processes illustrated in FIGS. 2 and 4-6. In some embodiments, the apparatus 300 may include a processing circuitry 302 as shown in FIG. 3. In some embodiments, the components, or elements illustrated in and described with respect to FIG. 3 below may not be mandatory and thus one or more may be omitted in certain embodiments. Additionally, some embodiments may include further or different components or elements beyond those illustrated in and described with respect to FIG. 3. In some embodiments, the depicted apparatus 300 may comprise one or a plurality of physical devices, including distributed, cloud-based, and/or local devices.

Although some components are described with respect to functional limitations, it should be understood that the particular implementations necessarily include the use of particular computing hardware, such as the hardware shown in FIG. 3. It should also be understood that certain of the components described herein may include similar or common hardware. For example, two sets of circuitries for example, may both leverage use of the same processor(s), network interface(s), storage medium(s), and/or the like, to perform their associated functions, such that duplicate hardware is not required for each set of circuitry and a single physical circuitry may be used to perform the functions of multiple circuitries described herein. The use of the term circuitry as used herein with respect to components of the apparatuses described herein should therefore be understood to include particular hardware configured to perform the functions associated with the particular circuitry as described herein (e.g., based on instructions stored in memory).

In some embodiments, circuitry may include processing circuitry, storage media, network interfaces, input/output devices, and/or the like. In some embodiments, other elements of the apparatus 300 may provide or supplement the functionality of another particular set of circuitry. For example, the processor 306 in some embodiments provides processing functionality to any of the sets of circuitries, the memory 304 provides storage functionality to any of the sets of circuitry (e.g., storing computer executable instructions), the communications circuitry 310 provide network interface functionality to any of the sets of circuitry, and/or the like.

The apparatus 300 may include or otherwise be in communication with processing circuitry 302 that is configurable to perform actions in accordance with one or more example embodiments disclosed herein. In this regard, the processing circuitry 302 may be configured to perform and/or control performance of one or more functionalities of the apparatus 300 in accordance with various example embodiments, and thus may provide means for performing functionalities of the apparatus 300 in accordance with various example embodiments. The processing circuitry 302 may be configured to perform data processing, application, and function execution, and/or other processing and management services according to one or more example embodiments. In some embodiments, the apparatus 300 or a portion(s) or component(s) thereof, such as the processing circuitry 302, may be embodied as or comprise a chip or chip set. In other words, apparatus 300 or the processing circuitry 302 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 300 or the processing circuitry 302 may therefore, in some cases, be configured to implement an embodiment of the disclosure on a single chip or as a single "system on a chip." As such, in some cases, a chip or chipset may constitute means for performing one or more operations for providing the functionalities described herein.

In some embodiments, the processing circuitry 302 may include a processor 306 (and/or co-processor or any other processing circuitry assisting or otherwise associated with the processor) and, in some embodiments, such as that illustrated in FIG. 3, may further include memory 304. The processing circuitry 302 may be in communication with or otherwise control a user interface (e.g., embodied by input/output circuitry 308) and/or a communications circuitry 310. As such, the processing circuitry 302 may be embodied as a circuit chip (e.g., an integrated circuit chip) configured (e.g., with hardware, software or a combination of hardware and software) to perform operations described herein.

The processor 306 may be embodied in a number of different ways. For example, the processor 306 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 306 may comprise a plurality of processors. The plurality of processors may be in operative communication with each other and may be collectively configured to perform one or more functionalities of the apparatus 300 as described herein. In some example embodiments, the processor 306 may be configured to execute instructions stored in the memory 304 or otherwise accessible to the processor 306. As such, whether configured by hardware or by a combination of hardware and software, the processor 306 may represent an entity (e.g., physically embodied in circuitry—in the form of processing circuitry 302) capable of performing operations according to embodiments of the present disclosure while configured accordingly. Thus, for example, when the processor 306 is embodied as an ASIC, FPGA or the like, the processor 306 may be specifically configured hardware for conducting the operations described herein. Alternatively, as another example, when the processor 306 is embodied as an executor of software instructions, the instructions may specifically configure the processor 306 to perform one or more operations described herein. The use of the terms "processor" and "processing circuitry" may be understood to include a single core processor, a multi-core processor, multiple processors internal to the apparatus 300, and/or one or more remote or "cloud" processor(s) external to the apparatus 300.

In some example embodiments, the memory 304 may include one or more non-transitory memory devices such as, for example, volatile and/or non-volatile memory that may be either fixed or removable. In this regard, the memory 304 may comprise a non-transitory computer-readable storage medium. It will be appreciated that while the memory 304 is illustrated as a single memory, the memory 304 may comprise a plurality of memories. The memory 304 may be configured to store information, data, applications, instructions and/or the like for enabling the apparatus 300 to carry out various functions in accordance with one or more example embodiments. For example, the memory 304 may be configured to buffer input data for processing by the processor 306. Additionally, or alternatively, the memory 304 may be configured to store instructions for execution by the processor 306. The memory 304 may include one or more databases that may store a variety of files, contents, or data sets. Among the contents of the memory 304, applications may be stored for execution by the processor 306 in order to carry out the functionality associated with each respective application. In some cases, the memory 304 may be in communication with one or more of the processors 306, input/output circuitry 308, and/or communications circuitry 310, via a bus(es) for passing information among components of the apparatus 300.

The apparatus 300 may comprise one or more interfaces 314. For example, in the depicted embodiment, the interfaces 314 include input/output circuitry 308 and communications circuitry 310. The input/output circuitry 308 may provide output to the user or an intermediary device and, in some embodiments, may receive one or more indication(s) of user input. In some embodiments, the input/output circuitry 308 is in communication with processor 306 to provide such functionality. The input/output circuitry 308 may include one or more user interface(s) and/or include a display that may comprise the user interface(s) rendered as a web user interface, an application interface, and/or the like, to the display of a requesting entity, a backend system, or the like. The input/output circuitry 308 may be in communication with the processing circuitry 302 to receive an indication of a user input at the user interface and/or to provide an audible, visual, mechanical, or other output to the user. As such, the input/output circuitry 308 may include, for example, a keyboard, a mouse, a joystick, a display, a touch screen display, a microphone, a speaker, and/or other input/output mechanisms. As such, the input/output circuitry 308 may, in some example embodiments, provide means for a user to access and interact with the apparatus 300. The processor 306 and/or input/output circuitry 308 comprising or otherwise interacting with the processor 306 may be configured to control one or more functions of one or more user interface elements through computer program instructions (e.g., software and/or firmware) stored on a memory accessible to the processor 306 (e.g., stored on memory 304, and/or the like). In at least some embodiments, the input/output circuitry 308 may be configured to receive user input associated with one or more document generation prompts and/or one or more document generation prompts.

The communications circuitry 310 may include one or more interface mechanisms for enabling communication with other devices and/or networks. In some cases, the communications circuitry 310 may be any means such as a device or circuitry embodied in either hardware, or a combination of hardware and software that is configured to receive and/or transmit data from/to a network and/or any other device or module in communication with the processing circuitry 302. The communications circuitry 310 may, for example, include an antenna (or multiple antennas) and supporting hardware and/or software for enabling communications with a wireless communication network (e.g., a wireless local area network, cellular network, global positing system network, and/or the like) and/or a communication modem or other hardware/software for supporting communication via cable, digital subscriber line (DSL), universal serial bus (USB), Ethernet or other methods. In at least some embodiments, the communications circuitry 310 enables the apparatus 300 to communicate with various external entities, such as document repositories 150, AI systems 130, and/or external entities 140 as depicted with respect to FIG. 1.

In some embodiments, the apparatus 300 may include analytical circuitry 312 which may include hardware components, software components, and/or a combination thereof configured to, with the processing circuitry 302, input/output circuitry 308 and/or communications circuitry 310, perform one or more functions associated with the client device of an content enhanced string match matrix environment (as described above with reference to FIG. 1 and FIG. 2). For example, in the depicted embodiment, the analytical circuitry 312 comprises prompt generation circuitry 315 configured to facilitate the functions of the prompt generation engine (e.g., prompt generation engine 110 shown in FIG. 1), string generation circuitry 316 configured to facilitate the functions of the string generation engine (e.g., string generation engine shown in FIG. 1), vectorization circuitry 318 configured to facilitate the functions of the vectorization engine (e.g., vectorization engine 114 shown in FIG. 1), comparison circuitry 320 configured to facilitate the functions of the comparison engine (e.g., comparison engine 116 shown in FIG. 1), matrix generation circuitry 322 configured to facilitate the functions of the matrix generation engine (e.g., matrix generation engine 118 of FIG. 1), and linking string generation circuitry 324 configured to facilitate the functions of the linking string generator (e.g., linking string generator 119 of FIG. 1). In some embodiments, the analytical circuitry 312 may access, facilitate access, receive process, manipulate, provide, or otherwise use, or make available for use, data used by one or more other components of the apparatus 300 through, for example, the use of program code executed using a processor, such as the processor 306. In some embodiments, the analytical circuitry 312 may interact with the memory 304, which may store the aforementioned data. It should also be appreciated that, in some embodiments, the analytical circuitry 312 may include a separate processor, specially configured field programmable gate array (FPGA), or application specific interface circuit (ASIC) to provide or otherwise facilitate access to such data used by one or more other components of the apparatus 300. The analytical circuitry 312 may also provide for communication with other components of the apparatus, system and/or external systems via a network interface provided by the communications circuitry 310.

In some embodiments, the apparatus 300 may include AI circuitry 330 which may include hardware components, software components, and/or a combination thereof configured to, with the processing circuitry 302, input/output circuitry 308 and/or communications circuitry 310, perform one or more functions associated with the client device of various AI systems (e.g., AI systems 130 as described above with reference to FIG. 1 and FIG. 2). For example, in the depicted embodiment, the AI circuitry 330 comprises training circuitry 332 configured to facilitate the functions of the training engine (e.g., training engine 132 shown in FIG. 1), validation circuitry 334 configured to facilitate the functions of the validation engine (e.g., validation engine 134 shown in FIG. 1), and execution circuitry 336 configured to facilitate the functions of the execution engine (e.g., execution engine 136 shown in FIG. 1). In some embodiments, the analytical circuitry 312 may access, facilitate access, receive process, manipulate, provide, or otherwise use, or make available for use, data used by one or more other components of the apparatus 300 through, for example, the use of program code executed using a processor, such as the processor 306. In some embodiments, the AI circuitry 330 may interact with the memory 304, which may store the aforementioned data. It should also be appreciated that, in some embodiments, the AI circuitry 330 may include a separate processor, specially configured field programmable gate array (FPGA), or application specific interface circuit (ASIC) to provide or otherwise facilitate access to such data used by one or more other components of the apparatus 300. The AI circuitry 330 may also provide for communication with other components of the apparatus, system and/or external systems via a network interface provided by the communications circuitry 310.

Example Methods

The processes illustrated in FIGS. 4A-6 represent example implementations of various aspects of the present disclosure. It should be understood that these processes are provided for illustrative purposes only and are not intended to limit the scope of the disclosure. In practice, the steps shown may be performed in different orders, combined, modified, or omitted entirely based on specific implementation requirements unless noted otherwise or prohibited by the steps themselves. Additionally, other steps not explicitly depicted may be added to augment the functionality or address particular use cases. The flexibility of these processes allows for adaptation to various analysis and comparison scenarios.

Figure 4A:
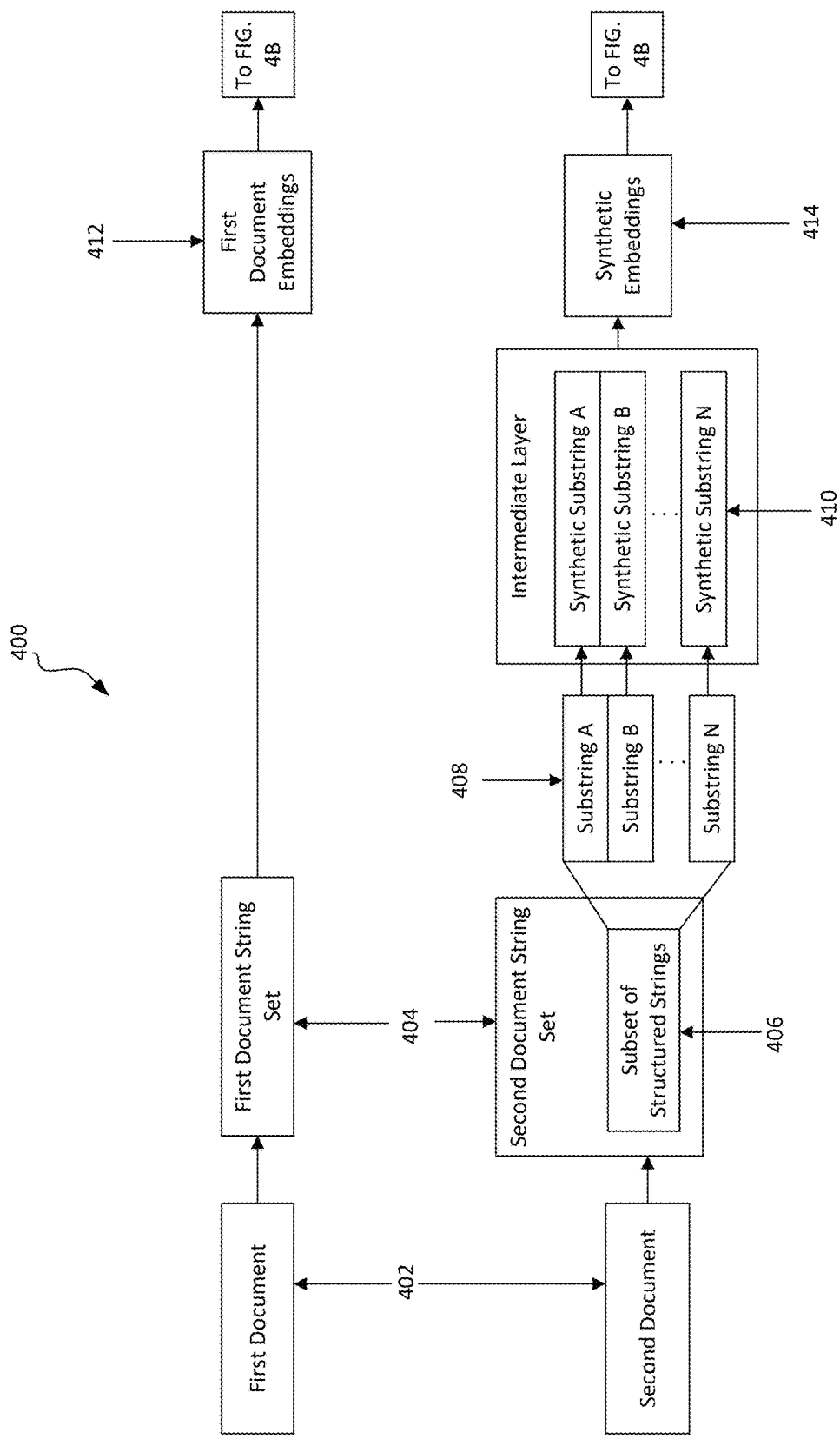
FIGS. 4A-4B illustrate a flowchart depicting an example process for generating a string match matrix data structure in accordance with at least one embodiment of the present disclosure.
Figure 4B:
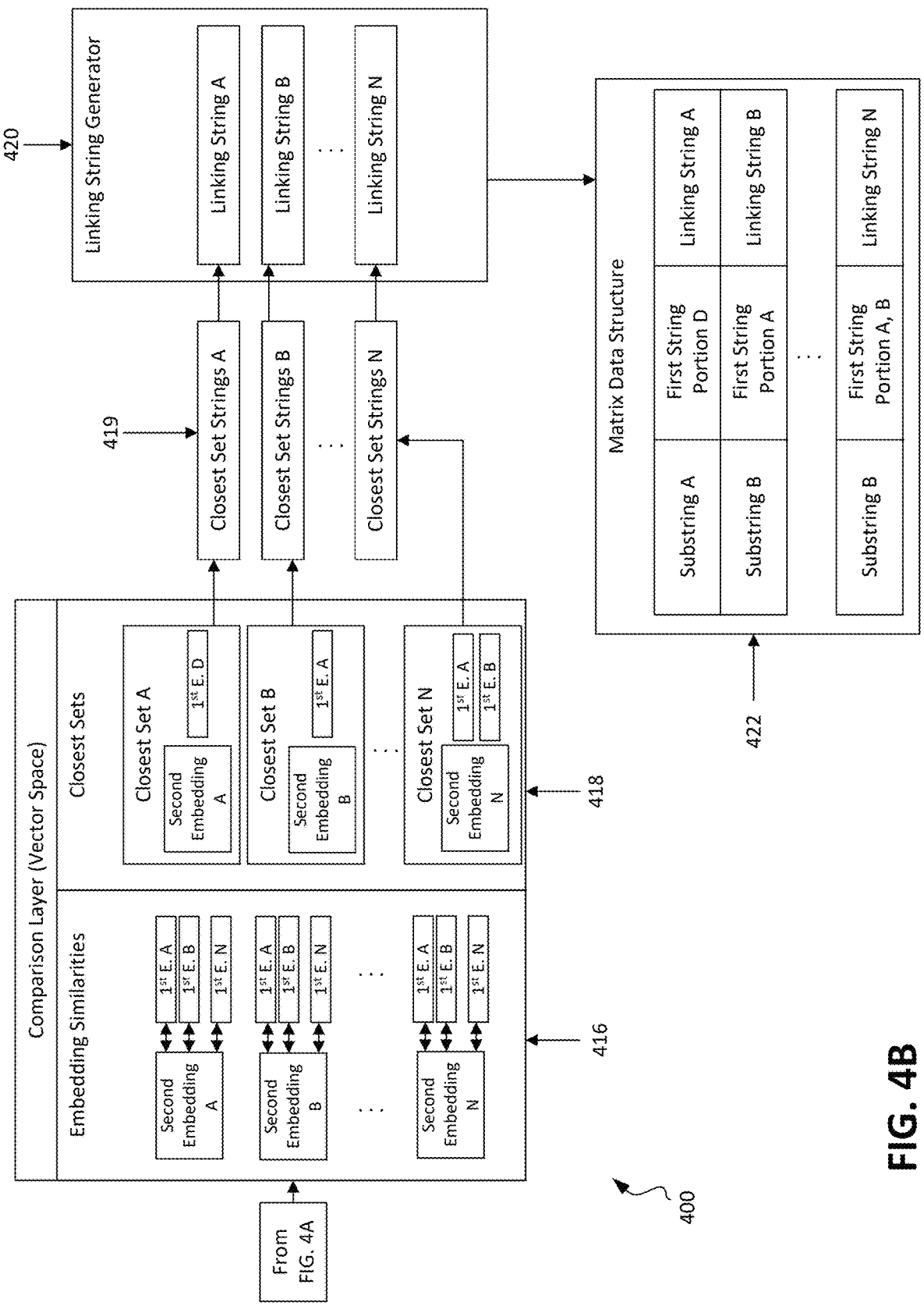
Figure 4C:
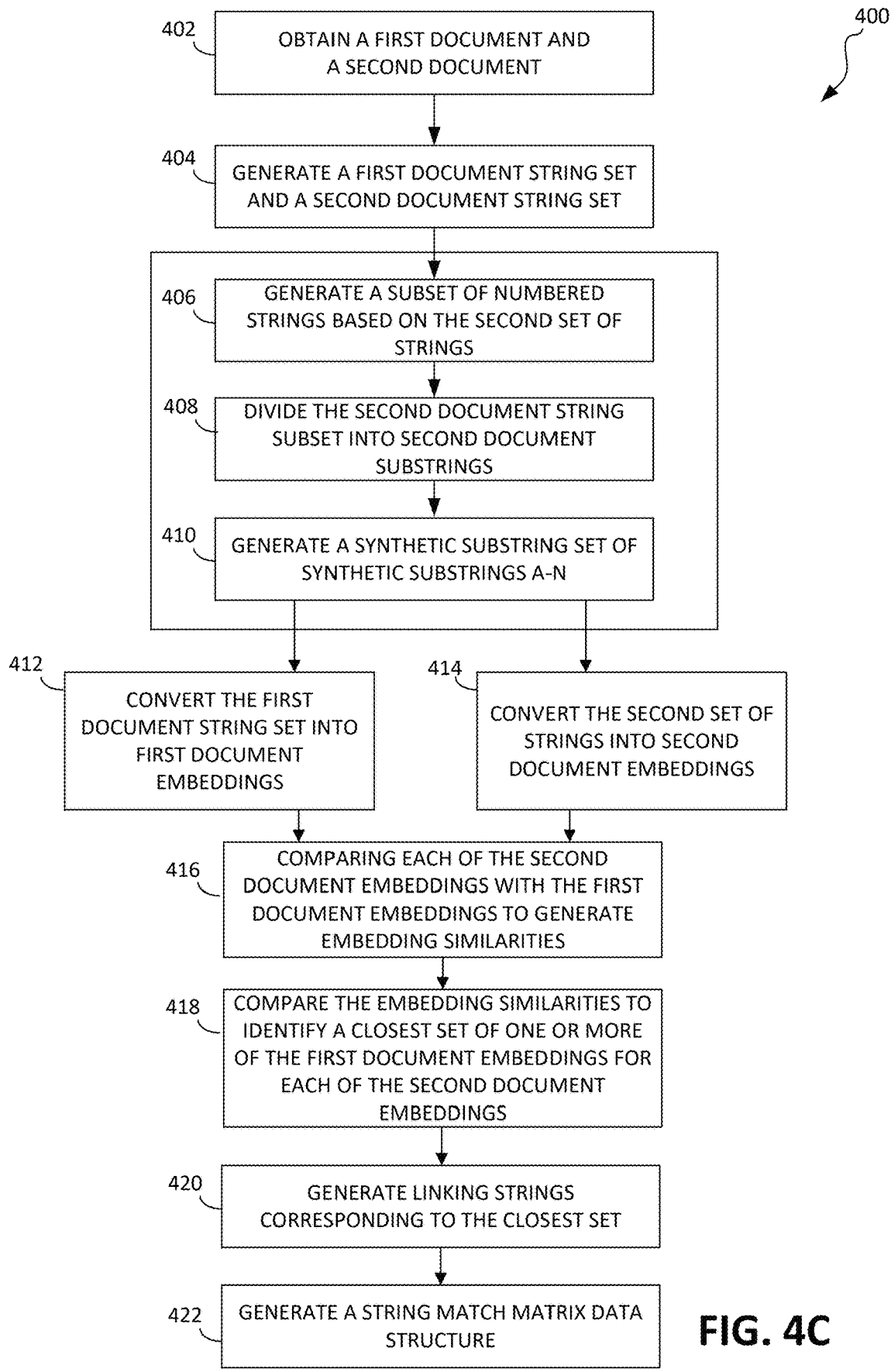
FIG. 4C illustrates a flowchart depicting an example process for generating a string match matrix data structure in accordance with at least one embodiment of the present disclosure.

FIG. 4, which is made up of FIGS. 4A-4C illustrates an example process, with FIGS. 4A and 4B illustrating the document handling and analysis processes described herein and FIG. 4C illustrating a corresponding flowchart depicting an example process 400 for generating an enhanced string match matrix. As depicted, the example process 400 may include obtaining (402) a first document and a second document; generating (404) a first document string set and a second document string set respectively; generating (406) a second document string subset based on the second document string set; dividing (408) the second document string subset into a second document substrings of substrings A-N; generating (410) a synthetic substring set of a synthetic substrings A-N based on the second document substrings; converting (412) the first document string set into first document embeddings, converting (414) the synthetic substrings into synthetic embeddings; comparing (416) each of the synthetic embeddings with the first document embeddings to generate embedding similarity values (e.g., similarity scores); comparing (418) the embedding similarity values to identify a closest embedding set of one or more of the first document embeddings for each of the second plurality of embeddings; generating (420) linking strings corresponding to the closest embedding set of embeddings, and generating (422) a string match matrix data structure based on the closest embedding set. Example process 400 may enable an improved technique for enhanced string match matrix generation and various generation and validation processes associated therewith.

Although the generation and use of the synthetic strings is shown only in conjunction with the second document, the same or similar techniques can be used for the first document in addition or instead. As a result, the closest embedding set can match first document synthetic embeddings with second document synthetic embeddings, which can then be deconstructed into respective portions of the documents that resulted in the synthetic representations that correspond to the embeddings, which are then put into the matrix.

At step 402, referring to FIGS. 4A and 4C, at least one apparatus (e.g., apparatus 300 shown in FIG. 3 executing the processes and functionalities shown in FIGS. 1 and 2) obtains a first document and a second document. Obtaining (402) a first document and a second document may include receiving the documents from a user device or other external source. Obtaining (402) the first document and/or the second document may include querying a document database system (e.g., document database system 120 shown in FIG. 1) and/or one or more document repositories (e.g., document repositories 150 shown in FIG. 1). In some examples, obtaining the documents can include obtaining the document by retrieving document data from a uniform resource locator, uniform resource identifier, or file path that leads to the document. In at least some embodiments, the first document may be a source document comprising a description of a subject component (e.g., physical or virtual product and/or service). The source document may include a human-provided description of the subject component received via user input. In some embodiments, the first document may be a synthetic document. In at least some embodiments, obtaining (402) the first document may include prompting a generative AI system (e.g., AI systems 130 as shown in FIG. 1) to generate a description of a subject product, producing the synthetic document. In such embodiments, a user may issue a prompt indicating a subject component, and/or may provide instructions for generating a prompt to an AI system. For example, the user may indicate one or more features of the subject component that they want well-defined by the product description, such as intended use cases, feature types, similar components, and the like. As such, the first document may be a document or text description of a subject component generated by one or more generative AI systems and/or human inputs, and the document may be generated contemporaneously with the process or may be stored and retrieved from a repository.

With respect to the above, user input may be received in the form of verbal, visual, or text instructions, interface selection, document or data file upload, or the like, and may be explicit or implicit (e.g., initiated automatically during a user browsing session). The user input may be processed using one or more natural language processing techniques to translate a prompt generation request/document query from a natural language description to one or more sets of operational terms and/or features. In at least some embodiments, obtaining (402) a first document and a second document may include generating or retrieving a document generation contextual construct to facilitate synthetic document generation in embodiments in which a synthetic document is used for either the first or second document.

In at least some embodiments, the document generation contextual construct may be selected, generated, or identified, such as by the apparatus autonomously or semi-autonomously (e.g., based on a user selection of programmatically determined options), by querying at least one repository to determine the most common types of documents associated with the indicated component and/or components of a same type as the indicated subject component. In such embodiments, apparatus 300 may be configured to generate a document generation contextual construct based on a combination of a plurality of most common descriptive features associated with documents of the repositories.

At step 404, shown in FIGS. 4A and 4C, apparatus 300 generates a first document string set and a second document string set, respectively. The first document string set may comprise strings corresponding to the contents of the first document, and the second document string set may comprise strings corresponding to the contents of the second document. Generating (404) a first document string set and a second document string set may include converting a document (such as the source document or the synthetic document) into a collection of substrings or tokens that can be used for analysis, comparison, or processing. In at least some embodiments, generating (404) a first document string set and a second document string set includes parsing the document text into discrete string-based units, such as parsing along delimiters or into chunks of characters based on length. In some examples, one or both of the documents include one or more respective images, figures, or diagrams, which can be converted into textual descriptions (e.g., using a m7ultimodal artificial intelligence that is configured or prompted to provide a textual description of an image). In some examples, the document is or contains video or audio content, which is converted into textual content (e.g., using a generative artificial intelligence or a speech-to-text system).

At step 406, as shown in FIGS. 4A and 4C, apparatus 300 generates a subset of numbered strings. Generating (406) a subset of numbered strings may include generating numbered or otherwise ordered strings from the second document string set associated with the second document. In some embodiments, either the first or second document may include at least a second document string subset (e.g., the second document in the illustrated example). In some embodiments the second document string subset may describe or relate to one or more subsets of unstructured strings in the second document.

At step 408, as shown in FIGS. 4A and 4C, apparatus 300 may divide the second document string subset into a second document substrings. The substrings may be generated in some embodiments by dividing the second document string subset across one or more delimiting features (e.g., punctuation, symbols, line breaks, paragraph breaks, tags, logical groupings, phrases, or the like). The substrings may each include one or more portions of the second document string subset that can be used for analysis, comparison, or processing. In some embodiments, the substrings may relate to each other or may be independent of each other. For example, in some embodiments, one or more substrings may provide context to another substring.

At step 410, as shown in FIGS. 4A and 4C, apparatus 300 may generate a synthetic substring set of synthetic substrings A-N. In some embodiments, the synthetic substrings may be generated for at least structured strings associated with either the first document or the second document, with the depicted embodiment including structured substrings in the second document. The synthetic substring set may include synthetic substrings A-N, which may be generated by augmenting respective ones of the second document substrings with context extracted from others of the second document substrings to generate the second plurality of synthetic substrings. In some examples, the context is pulled from elsewhere. In some embodiments, the context may be based on a feature type associated with the respective ones of the second document substrings. For example, one or more substrings may be associated with a particular feature type. The apparatus (e.g., via one or more AI systems) may be configured to use an LLM to generate a new enhanced description of each substring, which may be formatted for input to a vectorization engine and may comprise all of the relevant context for each particular substring within the same substring to increase the accuracy of the embedding and the accuracy of subsequent comparisons.

As a specific, simplistic example, the second document synthetic substrings may, in separate locations, describe a box using the following sentences: "there is a box"; "the box is wooden"; "the box is heavy"; "the wood is arranged to form a cube", "the wood is painted", "the paint is red". Attempting to match these individually with parts of the first document could result in erroneous or misleading matches. However, combining these aspects into a synthetic sentence or string prior to vectorization can enhance matching. For example, a synthetic vectorizable representation of those substrings could be: "The box is a heavy, wooden cube that is painted red".

At step 412, apparatus 300 converts the members of the first document string set into first document embeddings. Converting (412) the first document string set into first document embeddings may include converting the first document string set into numerical vectors or arrays of numbers. In at least some embodiments, converting (412) the first document string set into first document embeddings includes leveraging techniques such as one-hot encoding, bag of words (BoW), TF-IDF, word embeddings, transformer-based encodings, other techniques, or combinations thereof. In at least some embodiments, converting (412) the first document string set into first embeddings includes transforming the first document string set into dense-fixed length numerical vectors in a high-dimensional space, such that similar inputs are mapped to nearby points in that space. Converting (412) the first document string set into first embeddings may include converting the first document string set into numerical vectors preserving structure, meaning, or frequency enabling computation and modeling.

At step 414, as shown in FIGS. 4A and 4C, apparatus 300 converts the second set of strings, the second document substrings, and/or the synthetic substrings into second embeddings. For example, in the depicted embodiment, the synthetic substrings are converted into the second embeddings. Converting (414) the synthetic substrings into the synthetic embeddings may include converting the synthetic substrings into numerical vectors or arrays of numbers. In at least some embodiments, converting (414) the synthetic substrings into the synthetic embeddings includes leveraging techniques such as one-hot encoding, bag of words (BoW), TF-IDF, word embeddings, or transformer-based encodings. In at least some embodiments, converting (414) the synthetic substrings into the synthetic embeddings includes transforming the synthetic substrings into dense-fixed length numerical vectors in a high-dimensional space, such that similar inputs are mapped to nearby points in that space. Converting (414) the synthetic substrings into the synthetic embeddings may include converting the synthetic substrings into numerical vectors preserving structure, meaning, or frequency enabling computation and modeling.

At steps 416 and 418, as shown in FIGS. 4B and 4C, apparatus 300 compares the first document embeddings and the second document embeddings (e.g., synthetic embeddings) to identify a closest embedding set. Comparing (416) the first document embeddings and the second document embeddings may include determining embedding similarity values between the first document embeddings and the second document embeddings. In at least some embodiments, determining the embedding similarity values includes generating a similarity score by performing embedding comparison and determining whether the sets of embeddings satisfy one or more similarity conditions. Comparing (416) the first document embeddings and the second document embeddings may include determining a similarity associated with a set of similarity conditions (e.g., a first similarity associated with a first set of similarity conditions for a first pair of embeddings, a second similarity associated with a second set of similarity conditions for a second pair of embeddings). Comparing (416) the first document embeddings and the second document embeddings may include evaluating a numerical similarity between the embeddings to determine how closely their underlying inputs are in meaning, structure, and/or context. Comparing (416) the first document embeddings and the second document embeddings may include determining a cosine similarity between a first embedding of the first document embeddings and a second embedding of the second document embeddings. In at least some embodiments, comparing (416) the first document embeddings and the second document embeddings may include determining a Euclidean distance between a first embedding and a second embedding, wherein larger values for the Euclidean distance indicate a higher dissimilarity the embeddings. In some embodiments, a one-to-many matching algorithm may be used to associate each of the synthetic embeddings with one or more of the first document embeddings.

Comparing (418) the first document embeddings and the second document embeddings may include identifying a closest embedding set based on the plurality of embedding similarity values. The closest embedding set can correspond to one or more strings of the first document string set that match a string associated with the second set of strings, the second document substrings, the second document substrings, and/or second plurality of embeddings. The closest embedding set may then be converted back from vector space into corresponding closest embedding set strings (419) or otherwise associated with the original strings as shown in FIG. 4B. The closest embedding set may include one or more matching strings for each of the second set of strings, the second document substrings, the second document substrings, and/or second plurality of embeddings.

In one example, for each respective synthetic embedding of the synthetic embedding set, a similarity is calculated between that respective synthetic embedding and each embedding of the first document embeddings. Then, the resulting similarity values, for each respective synthetic embedding, can be filtered, ranked, or otherwise processed to form a closest embedding set for that respective synthetic embedding that includes the respective synthetic embedding (or the portions of the second document used to build it), and the associated parts of the first document that pass the processing.

At step 420, as shown in FIGS. 4B and 4C, apparatus 300 generates one or more linking strings corresponding to the closest embedding set. Generating (420) one or more linking strings corresponding to the closest embedding set may include defining an association between one or more first strings of the first document string set and one or more strings or substrings of the first document string set (e.g., one or more of the second document substrings of the second document string subset) associated with the closest embedding set. Generating a linking string may comprise generating one or more synthetic strings (e.g., via AI system employing an LLM) indicating portions of the first document and portions of the second document associated with the closest embedding set as described herein.

At step 422, shown in FIGS. 4B and 4C, apparatus 300 generates a string match matrix data structure. Generating (422) a string match matrix data structure may comprise generating a string match matrix data structure comprising a plurality of substring rows. Up to each substring row of the plurality of substring rows may comprise (i) a first cell describing a second substring, (ii) one or more second cells describing one or more corresponding respective portions of the first document and/or second document, and (iii) a corresponding linking string. The order of the cells within each substring row may be interchanged. The substring rows may be associated with discrete substrings of the second document substrings associated with the second document string subset of the second document. The string match matrix data structure may be configured to define associations between first strings, second strings, and linking strings. The similarity data matrix structure may further integrate numbered structured substrings, corresponding respective portions of the second document (e.g., unstructured portions and/or structured portions), corresponding respective portions of the first document (e.g., unstructured portions describing the particular substring associated with the row, and in some embodiments, including metadata associated with the portions of the first document (e.g., page and line number). In some embodiments, the data associated with the matrix (e.g., the various string associations) may be generated and used for the various processes herein in any form or configuration and may be formatted in any configuration or data structure.

In an example, a string match matrix data structure is generated that includes (1) rows ordered based on an ordering of the second document second text content and (2) columns. Each respective row can be associated with at least one respective second document substring of the second document substrings. Further, each row may comprise multiple cells. A first cell of the cells of the row can be associated with a first column of the columns. The first cell can include the at least one second document substring. A second cell can be associated with the respective row and a second column of the columns. That second cell includes a linking string associated with the at least one respective second document substring. A third cell can be associated with the respective row and a third column of the columns. The third cell can include the one or more first document strings used to generate the linking string of the second cell.

In at least some embodiments, apparatus 300 may be configured to store the string match matrix data structure in a repository. The string match matrix data structure may additionally include, for a subject substring row, an indication of where one or more features indicated by the substring row originated. For example, a first citation cell may include a document label identifying a document via which the subject feature was discerned. A second citation cell may be configured to identify a location (page number, paragraph number, and/or the like) within the document where the subject feature was identified. Such a citation cell may include a relevant descriptor enabling identification of a source for a corresponding substring. In at least some embodiments, each substring row may include one or more cells describing (i) one or more corresponding respective portions of the first document, (ii) one or more corresponding respective portions of the second document, (iii) a subject structured string, (iv) a subject structured substring, and/or (v) a subject unstructured string.

In at least some embodiments, apparatus 300 is additionally configured, as a part of process 400, to search for and obtain an additional document comprising an additional document string. The apparatus 300 may be configured to identify a duplicate document (e.g., the first document and/or an additional document, in each case satisfying a similarity condition relative to the second document or at least the second document string subset of the second document) based on a similarity of one or more strings of the duplicate document to at least one structured string of the second document. In some embodiments, the additional document may be identified by searching a repository for documents satisfying a similarity condition relative to the first document or the second document. In some embodiments, the additional document may be identified by generating one or more synthetic structured strings based on the unstructured strings in the first document and/or generating one or more synthetic unstructured strings based on the structured strings in the second document and searching for similar documents to the one or more synthetic strings.

In at least some embodiments, apparatus 300 is additionally configured to, as a part of process 400, detect a duplication error relative to an unpermissioned document. In some instances, the duplication error may be remediated prior to training or updating the training of an AI model (e.g., as shown with respect to FIG. 8) and a string matrix data structure may be used to organize the training data and to audit the training data (e.g., before and after deletion of the duplication error). The matrix further provides bidirectional inference whereby correlation between each of the strings of the compared documents can be audited against the other. Detecting a duplication error relative to an unpermissioned document may include identifying, via one or more repositories, one or more instances of a third-party implementation of one or more documents determined to match (e.g., satisfying a similarity condition upon performance of a document, string, or embedding comparison) the subject document having structured strings therein (e.g., the second document in the present example) and/or one or more of the generated documents based on or substantially similar to the subject document (e.g., whether structured or unstructured).

In at least some embodiments, detecting a duplication error relative to an unpermissioned document may include searching the one or more repositories to identify documents which meet or exceed a defined activity threshold and comparing such documents to the subject (e.g., second) document and/or one or more structured strings of the subject (e.g., second) document. A defined activity threshold may indicate a threshold number of accesses, uses, comments, mentions, or other interactions according to which potentially large sets of documents can be filtered. In at least some embodiments, detecting a duplication error relative to an unpermissioned document may further include filtering the entries of the one or more repositories based on one or more defined preferred features. For example, the one or more defined preferred features may include specific use cases associated with a document, fields of implementation associated with a document, structural preferences associated with a document (such as length, syntax, etc.), and the like, such that the one or more defined preferred features enable filtering of the potentially large sets of documents within the repositories according to features associated with intended use cases, for example. Each of the foregoing may accelerate the search process and identify the most impactful duplicates for remediation, which thereby further improves the AI model performance.

In at least some embodiments, apparatus 300 is configured to, as a part of process 400, triggers a remediation action with respect to the duplication error. Triggering a remediation action with respect to the duplication error may include notifying a responsible party of the duplication error identified (e.g., notifying a user not to add the duplicate document to a training data set or a queue for generation of synthetic documents, such as a synthetic structured document). In such embodiments, the remediation action may be effective even in an instance in which the duplicate document is not controlled by the client system 101. In at least some embodiments, apparatus 300 is configured to generate an automated message for transmission to one or more entities notifying the entity(ies) of the identified duplication error (e.g., the user of the client system 101 shown in FIG. 1 or one or more external entities 140 shown in FIG. 1, which may include the owner or otherwise controlling entity for the unpermissioned document). The apparatus 300 may be configured to prompt a user (e.g., a user of the client system 101 shown in FIG. 1) for input regarding the generated automated message. In at least some embodiments, triggering a remediation action with respect to the duplication error may include analyzing a set of historical remediation actions relative to a set of similar historical duplication errors to determine one or more predicted outcomes associated with the identified duplication error. In such embodiments, triggering a remediation action with respect to the duplication error may include generating a notification to the user and/or a message to the responsible party based at least in part on the one or more predicted outcomes.

In at least some embodiments, triggering a remediation action with respect to the duplication error may include automatically initiating deletion of the duplicate document, hiding of the duplicate document, locking of the duplicate document, de-indexing or deprioritizing of the duplicate document in search results (e.g., such that the original document appears before the duplicate document in searches and/or the duplicate document does not appear), causing searches and/or links to the unpermissioned document to redirect to the a subject (e.g., second) document (e.g., avoiding dependency issues for other documents that depend on the unpermissioned document), and/or granting allocating privileges associated with the original document (e.g., to systems, parties, entities, users, or the like associated with the duplicate document). Thus, the one or more repositories may have their document quality improved, search speed improved, storage space reduced, and may minimize errors associated with AI based document duplication. In some embodiments, automatically initiating removal in this manner may include automatically generating and sending a message to the responsible party requesting removal of the unpermissioned document, for example. In at least some embodiments, triggering a remediation action with respect to the duplication error may include enabling one or more privileges for the responsible party (e.g., the entity controlling the unpermissioned document) or relevant document to permit their document-dependent functions to remain uninterrupted or not substantially interrupted while deduplicating and improving the one or more repositories.

In an example, the system transmits a confirmation request regarding the duplication error that seeks to obtain confirmation from the recipient that a remediation action can be taken. The confirmation request can include the string match matrix data structure and can request confirmation regarding initiating a remediation action selected from the group consisting of: deletion of the first document, hiding the first document, locking the first document, de-indexing the first document from search results, deprioritizing the first document in search results, redirecting links to the first document to the second document, granting privileges associated with the second document, allocating privileges associated with the second document.

In at least some embodiments, apparatus 300 is configured to, as a part of process 400, obtain provision of privileges associated with one or more documents, such as those determined to match or be duplicates of the second document. The obtained privileges may include the right to use, reproduce, distribute, modify, publicly display or perform, and/or license the document or an asset associated with or described by the document. Obtaining provision of privileges associated with the document may include identifying an owner (e.g., a privilege-granting entity) of the document. In at least some embodiments, obtaining provision of privileges associated with the document includes automatically generating a message or communication to the owner of the document indicating intent to obtain the privileges. Generating a message or communication to the owner of the document may include prompting a user for one or more details of such a message. For example, a user may be enabled to provide or select terms for acquiring the privileges, such as computing system requirements, use restrictions, cost, ownership share percentages, and the like.

In at least some embodiments, obtaining provision of privileges associated with the document includes obtaining one or more electronic privileges associated with the document. Electronic privileges may include, for example, access rights or administrator rights to an associated repository and/or database system. In some embodiments, obtaining provision of privileges associated with a document may include adding the document to a training queue or flagging the document as approved for training one or more of the AI systems or for generating other documents using the document as a reference. In at least some embodiments, obtaining provision of privileges associated with the document includes calling an API configured to request one or more privileges associated with the document. Obtaining provision of privileges associated with the document may additionally include sending a validation request associated with a requested privilege to one or more external computing devices responsible for managing privileges associated with the document.

In at least some embodiments, such as those where privileges associated with the subject document are managed or otherwise implemented by a digital rights management (DRM) system, obtaining provision of privileges may include issuing a request to the DRM system for access to/ownership of the subject document. In such embodiments, the subject privileges dictate whether a subject system has the ability to control, access, or use the subject document. In at least some embodiments, example privileges may include, but are not limited to, login credentials, certificates, digital badges, required decryption information, and the like.

In at least some embodiments, as a part of process 400, apparatus 300 is configured to detect a duplication error based on the string match matrix data structure (e.g., two or more documents, subsets of documents, and/or strings or substrings matching a particular structured string). Apparatus 300 may further be configured to remediate the duplication error, accordingly, as described above.

In at least some embodiments, the source and/or the synthetic document comprise a description of a product or a service. In at least some embodiments, the synthetic document and/or the source document comprise a description and/or a recitation of one or more privileged portions of the product or the service as described.

Figure 5:
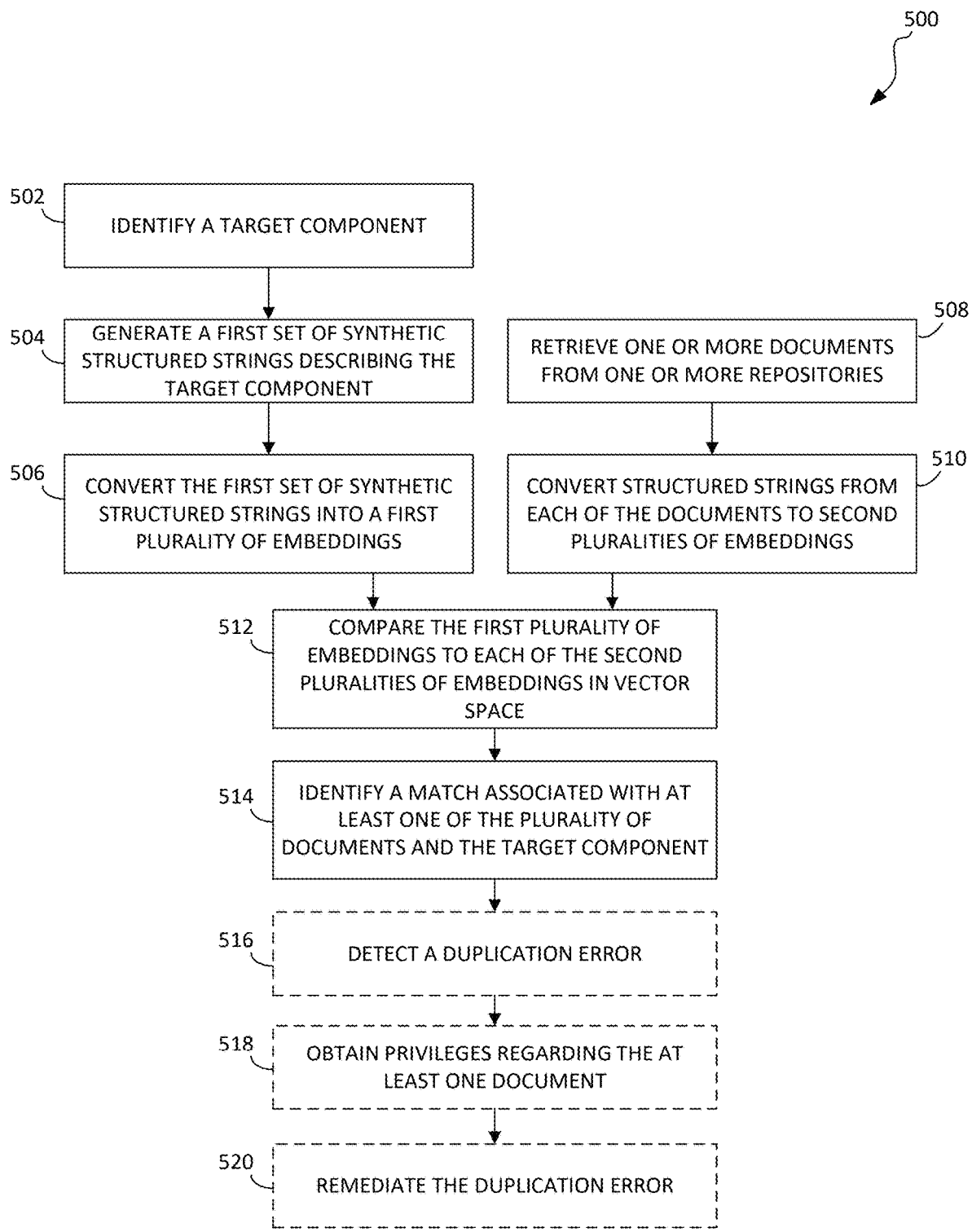
FIG. 5 illustrates a flowchart depicting an example process in accordance with at least one embodiment of the present disclosure.

FIG. 5 illustrates a flowchart depicting an example process 500 according to various embodiments of the present disclosure. As depicted, the example process 500 may include identifying (502) a target component (e.g., product or service); generating (504) a first set of synthetic structured strings describing the target component (e.g., via prompting one or more AI systems); converting (506) the first set of synthetic structured strings into a first plurality of embeddings; retrieving (508) a plurality of documents from one or more repositories; converting (510) strings from each of the plurality of documents to second pluralities of embeddings; comparing (512) the first plurality of embeddings to each of the second plurality of embeddings in vector space; identifying (514) a match associated with at least one of the plurality of documents and the target component; detecting (516) a duplication error associated with the target component and/or the at least one of the plurality of documents (e.g., the target component and/or strings based thereon lacking one or more privileges associated with the at least one document of the plurality of documents or vice versa); obtaining or allocating (518) one or more privileges to remediate (520) the duplication error (e.g., regarding the at least one of the plurality of documents). Example process 500 may enable an improved technique for remediating document duplication errors.

At step 502, apparatus 300 identifies a target component or receives an identification of the target component. Identifying (502) a target component may include receiving a document generation contextual construct defining a target component for identification. In at least some embodiments, the document generation contextual construct comprises or is received with a partial document, prompt, or the like describing the target component. In some embodiments, the document generation contextual construct may be created by the apparatus based on a name or prompt for the target component (e.g., causing the apparatus to search for a description associated with the target component, such as via one or more networks querying one or more repositories, including via the Internet). Identifying a target component may include generating the document generation contextual construct using a predetermined list of document objectives, wherein the predetermined list of document objectives is determined based on a frequency of one or more of the document objectives in a plurality of heterogeneously privileged document repositories. The document generation contextual construct may further include (and/or the AI system may be pre-trained or pre-prompted for) configuration instructions for generating one or more sets of structured strings describing the target component.

In at least some embodiments, identifying (502) a target component includes receiving an indication or selection of a target component via a user interface. The target or service may be selected/indicated via a web based application, for example.

At step 504, apparatus 300 generates a first set of synthetic structured strings describing the target component. Generating (504) a first set of synthetic structured strings describing the target component may include prompting one or more generative AI systems to generate one or more structured strings each describing at least one feature of the target component. The structured strings may include one or more structured substrings. In embodiments wherein a document generation contextual construct is received, generating the first set of strings describing the target component may include generating the first set of strings according to one or more preferences (e.g., via a configuration file) defined by the document generation contextual construct. In some embodiments, the apparatus may further be configured to generate one or more synthetic substring sets of synthetic substrings based on the structured strings as described with respect to the embodiments of FIGS. 1-4C.

At step 506, apparatus 300 is configured to convert the first set of synthetic structured strings into a first plurality of embeddings. Converting (506) the first set of synthetic structured strings into a first plurality of embeddings may include converting the first set of structured strings into numerical vectors or arrays of numbers in accordance with the various embodiments described herein. For example, in at least some embodiments, converting (506) the first set of structured strings into a first plurality of embeddings includes leveraging techniques such as one-hot encoding, bag of words (BoW), TF-IDF, word embeddings, or transformer-based encodings. In at least some embodiments, converting (506) the first set of structured strings into a first plurality of embeddings includes transforming the first set of structured strings into dense-fixed length numerical vectors in a high-dimensional space, such that similar inputs are mapped to nearby points in that space. Converting (506) the first set of structured strings into a first plurality of embeddings includes converting the first set of structured strings into numerical vectors preserving structure, meaning, or frequency enabling computation and modeling.

At step 508, apparatus 300 is configured to retrieve one or more documents from one or more repositories. The repositories may be controlled by or associated with the apparatus, or they may be external repositories, and the documents may each be in one or more forms, including complete files, portions of files, data entries in a database, or the like. The documents may each comprise at least a subset of structured strings. In some embodiments, a plurality of documents may be used. In some examples, the retrieved documents may satisfy one more criteria, such as relating to an owner, name, type, classification, title, other criteria, or combinations thereof.

At step 510, apparatus 300 is configured to convert structured strings from each of the one or more documents the one or more documents into one or more corresponding second embeddings. Converting (510) the structured strings into embeddings may include converting the structured strings into numerical vectors or arrays of numbers in accordance with the various embodiments described herein. For example, in at least some embodiments, converting (510) the structured strings into embeddings includes leveraging techniques such as one-hot encoding, bag of words (BoW), TF-IDF, word embeddings, or transformer-based encodings. In at least some embodiments, converting (510) the structured strings into embeddings includes transforming the structured strings into dense-fixed length numerical vectors in a high-dimensional space, such that similar inputs are mapped to nearby points in that space. Converting (506) the structured strings into embeddings includes converting the structured strings into numerical vectors preserving structure, meaning, or frequency enabling computation and modeling.

At step 512, apparatus 300 compares the first plurality of embeddings with each of the sets of the second pluralities of embeddings corresponding to each of the retrieved documents to detect a match between the target component and one or more of the retrieved documents. Comparing (512) the first embeddings and the second embeddings may include determining a plurality of embedding similarity values between the first embeddings and each of the second embeddings. In at least some embodiments, determining the embedding similarity values includes generating a similarity score, performing embedding comparison, and determining whether the sets of embeddings satisfy one or more similarity conditions. Comparing (512) the first set of embeddings and the second set of embeddings may include determining a similarity associated with a set of similarity conditions (e.g., a first similarity associated with a first set of similarity conditions for a first pair of embeddings, a second similarity associated with a second set of similarity conditions for a second pair of embeddings).

Comparing (512) the first set of embeddings and the second set of embeddings may include evaluating a numerical similarity between the embeddings to determine how closely their underlying inputs are in meaning, structure, and/or context. Comparing (512) the first set of embeddings and the second set of embeddings may include determining a cosine similarity between a first embedding of the first set of embeddings and each second embedding of the second set of embeddings. In at least some embodiments, comparing (512) the first set of embeddings and the second set of embeddings may include determining a Euclidean distance between a first embedding of the first set of embeddings and a second embedding of the second set of embeddings, wherein larger values for the Euclidean distance indicate a higher dissimilarity the embeddings.

Comparing (512) the first set of embeddings and each of the second sets of embeddings may include identifying one or more closest embedding sets based on the plurality of embedding similarity values, wherein the closest embedding set corresponds to one or more strings of the first set of structured strings that match one or more strings associated with the structured strings of the one or more documents. The closest embedding sets may then be converted back from vector space into corresponding closest embedding set strings or otherwise linked with the original structured strings. In the embodiment of FIG. 5, the apparatus is searching for matches between the first set of structured strings and any one or more of one or more retrieved documents, such that there may be multiple closest embedding sets generated. For example, any structured strings from any document satisfying the similarity conditions may be included in one or more closest embedding sets. Each closest embedding set may include one or more matching strings based on the comparison. In the embodiment of FIG. 5, the embedding comparison is between embeddings that are based on structured strings rather than one set of unstructured strings as discussed with respect to FIGS. 4A-4C.

At step 514, apparatus 300 identifies a match associated with at least one of the plurality of documents and the target component or the synthetic structured strings generated based on the target component. In the various embodiments, the satisfaction of one or more similarity conditions (e.g., which may correspond to inclusion in the closest embedding sets, embedding similarity values, or other conditions described herein) may indicate a match. In some embodiments, the matching at least one of the plurality of documents may be compared with another document as described with respect to FIGS. 4A-4C (e.g., the matching document may be used as the "second document" in the process of FIGS. 4A-4C in an example embodiment).

At step 516, apparatus 300 may identify a duplication error associated with the target component. The duplication error may comprise a match between the target component and one or more of the documents in an instance in which the target component and/or the one or more of the retrieved documents is unprivileged. The duplication error may also be a potential or predicted error subject to verification or further review (e.g., in the instance in which a hypothetical target component is summarized by a user as an input). In some embodiments, once the match between the target component and one or more documents is established, the apparatus may be configured to search for additional target components similar or identical to the target component (e.g., having a corresponding similarity condition). In some embodiments, the apparatus may generate a string match matrix data structure and/or linking strings for the matching component and document(s) in the manner described with respect to the embodiment of FIGS. 4A-4C.

Identifying a duplication error associated with at least one additional document describing an additional component may include comparing the first plurality of embeddings to one or more additional sets of embeddings for the additional component. The additional document(s) may be identified in a supplemental search or other subsequent query for additional components matching the identified retrieved document(s) that match the target component. In some embodiments, the at least one document describing the additional component may comprise unstructured or structured strings. In at least some embodiments, identifying a duplication error associated with the at least one document describing an additional component includes determining that the one or more additional sets of embeddings are substantially similar to the first plurality of embeddings (e.g., embedding similarity values satisfying a similarity condition). Identifying a duplication error associated with the at least one document describing an additional component may include comparing a determined similarity between the first plurality of embeddings and an additional set of embeddings to a similarity threshold, and determining that the determined similarity exceeds the similarity threshold. In some embodiments, the apparatus may generate string match matrix data structures and/or linking strings for the matching retrieved document(s) and additional component(s) and/or document(s) in the manner described with respect to the embodiment of FIGS. 4A-4C.

At step 518, privileges regarding the at least one document are obtained. The obtained privileges may include the right to reproduce, distribute, modify, publicly display or perform, and/or license the document, which may be allocated to the target component or strings based thereon. Obtaining provision of privileges associated with the document may include identifying an owner (e.g., a privilege-granting entity) of the document (e.g., in an instance of a distributed repository not managed by the apparatus). In at least some embodiments, obtaining provision of privileges associated with the document includes automatically generating a message or communication to the owner of the document indicating intent to obtain the privileges. Generating a message or communication to the owner of the document may include prompting a user for one or more details of such a message. For example, a user may be enabled to provide or select terms for acquiring the privileges, such as computing system requirements, use restrictions, cost, ownership share percentages, and the like.

At step 520, apparatus 300 may remediate the duplication error associated with the target component and/or one or more additional components. Remediating (520) the duplication error may include triggering a remediation action with respect to the duplication error, which may include notifying a responsible party of the duplication error identified. In at least some embodiments, apparatus 300 is configured to generate an automated message for transmission to one or more entities notifying the entity(ies) of the identified duplication error (e.g., the user of the client system 101 shown in FIG. 1 or one or more external entities 140 shown in FIG. 1, which may include the owner or otherwise controlling entity for the unpermissioned component). The apparatus 300 may be configured to prompt a user (e.g., a user of the client system 101 shown in FIG. 1) for input regarding the generated automated message. In at least some embodiments, triggering a remediation action with respect to the duplication error may include analyzing a set of historical remediation actions relative to a set of similar historical duplication errors to determine one or more predicted outcomes associated with the identified duplication error. In such embodiments, triggering a remediation action with respect to the duplication error may include generating a notification to the user and/or a message to the responsible party based at least in part on the one or more predicted outcomes.

In at least some embodiments in which the remediation is at least partly related to the document describing such target components or additional components, triggering a remediation action with respect to the duplication error may include automatically initiating deletion of the duplicate document, hiding of the duplicate document, locking of the duplicate document, de-indexing or deprioritizing of the duplicate document in search results (e.g., such that the original document appears before the duplicate document in searches and/or the duplicate document does not appear), causing searches and/or links to the unpermissioned document to redirect to the subject document (e.g., avoiding dependency issues for other documents that depend on the unpermissioned document), and/or granting allocating privileges associated with the original document (e.g., to systems, parties, entities, users, or the like associated with the duplicate document). Thus, the one or more repositories may have their document quality improved, search speed improved, storage space reduced, and may minimize errors associated with AI based document duplication. In some embodiments, automatically initiating removal in this manner may include automatically generating and sending a message to the responsible party requesting removal of the unpermissioned document, for example. In at least some embodiments, triggering a remediation action with respect to the duplication error may include enabling one or more privileges for the responsible party (e.g., the entity controlling the unpermissioned document) to permit their document-dependent functions to remain uninterrupted or not substantially interrupted while deduplicating and improving the one or more repositories.

Figure 6:
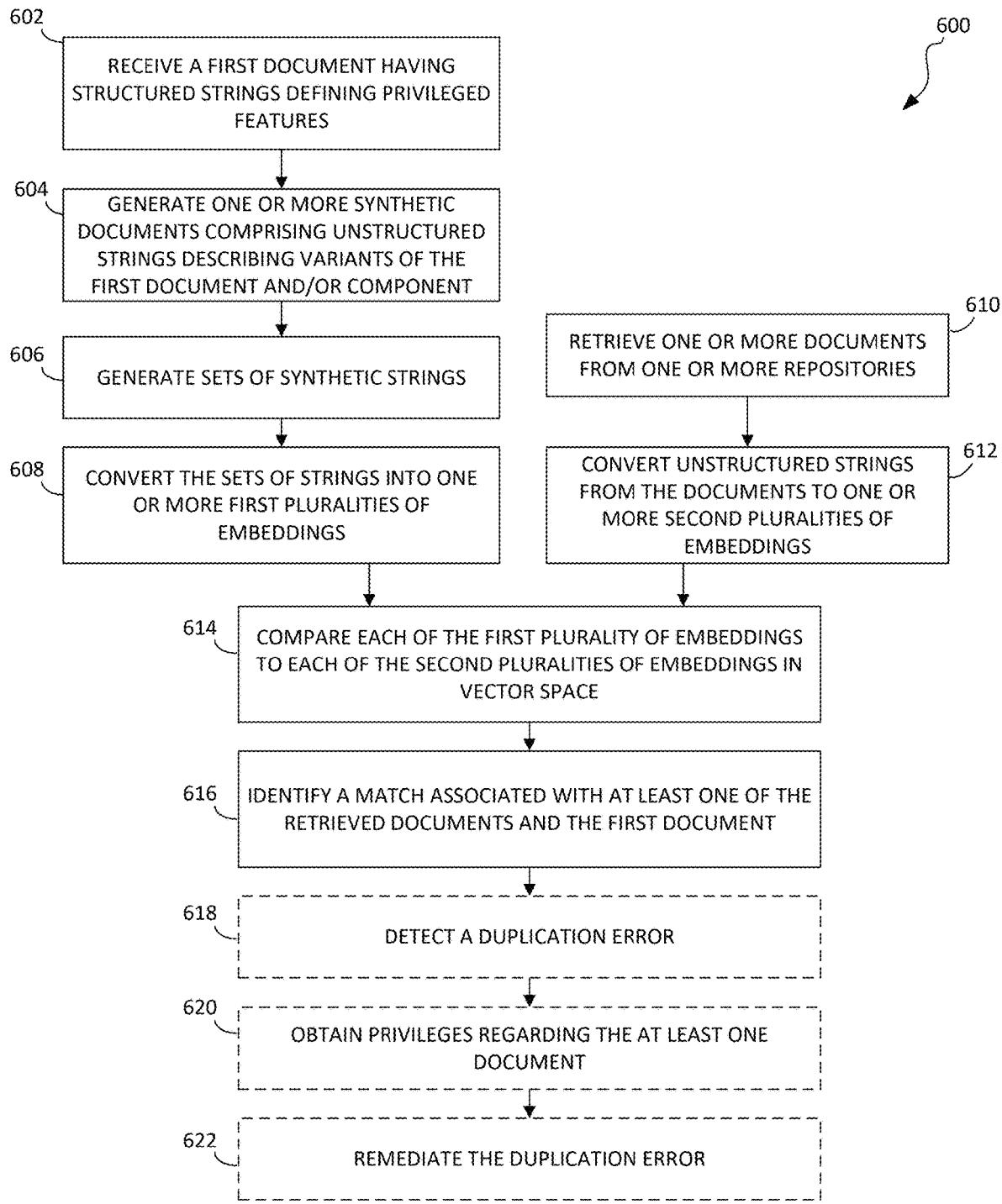
FIG. 6 illustrates a flowchart depicting an example process in accordance with at least one embodiment of the present disclosure.

In some embodiments, the system may be configured to start with one or more documents and identify components that match the documents. FIG. 6 illustrates a flowchart depicting an example process 600 according to various embodiments of the present disclosure. As depicted, the example process 600 may include receiving (602) a first document defining (e.g., via structured strings) one or more privileged features (e.g., features that may correspond to one or more components); generating (604) one or more documents comprising unstructured strings based on the first document (e.g., each document describing one or more product variants based on the one or more privileged features); generating (606) sets of strings for the one or more generated documents; converting (608) the sets of strings into one or more first pluralities of embeddings; retrieve (610) one or more documents from one or more repositories; converting (612) unstructured strings from the documents into one or more second pluralities of embeddings; comparing (614) each of the first plurality of embeddings to each of the second plurality of embeddings in vector space; identifying (616) a match associated wit hat least one of the retrieved documents and the first document; detecting (618) a duplication error associated with at least one of the retrieved documents identifying an unpermissioned component matching the first document; obtaining (620) privileges regarding the at least one of the retrieved documents; and causing initiation (622) of one or more remediation actions with respect to the retrieved document and/or a component associated therewith. Example process 600 may enable an improved technique for remediating document duplication errors.

At step 602, apparatus 300 receives a first document defining one or more privileged features. The document may comprise a plurality of strings, which may be structured strings, wherein each string describes one or more features of one or more target components. In at least some embodiments, receiving (602) a first document includes receiving, by the one or more processors, a document generation contextual construct or a document accompanying the document generation contextual construct describing the one or more privileged features. In some embodiments, a document generation contextual construct or such accompanying document may be generated by processing the first document (e.g., extracting text and generating the document generation contextual construct based on the text and/or a configuration file). In at least some embodiments, receiving (602) a first document includes querying one or more document repositories to identify a first document meeting one or more criteria (e.g., criteria input by a user).

At step 604, apparatus 300 generates one or more synthetic documents each describing component variants based on the one or more privileged features of the target component. The one or more documents may include unstructured strings describing one or more components related to the first document and/or the target component(s) associated with the first document. Generating (604) one or more synthetic documents may include generating one or more prompts configured to prompt an AI system to generate documents describing components associated with the first document (e.g., components which exhibit the one or more privileged features of the target component, such as with unstructured strings). For example, the AI system may be configured to first identify a plurality of components or features of component which correspond to one or more of the one or more privileged features in the first document. In at least some embodiments, the AI system may be prompted to conduct multiple iterative document generation processes based on feedback (automated feedback or user feedback, for example) regarding the identified plurality of components.

At step 606, the apparatus 300 is configured to generate a plurality of sets of strings for each of the one or more documents. The sets of strings may be unstructured and/or structured, and may correspond to at least a portion (e.g., a subset) of each generated document. Generating (606) the plurality of strings may include leveraging any number of the string conversion/string generation mechanisms described herein to generate a plurality of strings describing features of the plurality of documents. In some embodiments, steps 604 and 606 may be a single step resulting in the sets of strings. In some embodiments, steps 604 and 606 may be two discrete steps.

At step 608, the apparatus 300 is configured to convert each set of strings into one or more first pluralities of embeddings. The embeddings may be generated according to the various embodiments discussed herein.

At step 610, the apparatus 300 is configured to retrieve one or more documents from one or more repositories. The documents may include unstructured strings (e.g., unstructured springs describing components), which as discussed below, may be compared with the generated strings of the generated one or more documents to identify matches between the documents.

At step 612, the apparatus 300 is configured to convert each set of unstructured strings from the retrieved documents into one or more second pluralities of embeddings. The embeddings may be generated according to the various embodiments discussed herein.

At step 614, the apparatus 300 is configured to compare each of the first plurality of embeddings to each of the second plurality of embeddings in vector space to detect a match (e.g., which may include a duplication error) between any one of the documents associated with the first embedding space (e.g., indicating a match to the first document) and one or more of the retrieved documents. Comparing (614) the first embeddings and the second embeddings may include determining a plurality of embedding similarity values between the first embeddings and each of the second embeddings. In at least some embodiments, determining the embedding similarity values includes generating a similarity score, performing embedding comparison, and determining whether the sets of embeddings satisfy one or more similarity conditions. Comparing (614) the first set of embeddings and the second set of embeddings may include determining a similarity associated with a set of similarity conditions (e.g., a first similarity associated with a first set of similarity conditions for a first pair of embeddings, a second similarity associated with a second set of similarity conditions for a second pair of embeddings).

Comparing (614) the first set of embeddings and the second set of embeddings may include evaluating a numerical similarity between the embeddings to determine how closely their underlying inputs are in meaning, structure, and/or context. Comparing (614) the first set of embeddings and the second set of embeddings may include determining a cosine similarity between the first embedding of the first set of embeddings and each second embedding of the second set of embeddings. In at least some embodiments, comparing (614) the first set of embeddings and the second set of embeddings may include determining a Euclidean distance between a first embedding of the first set of embeddings and a second embedding of the second set of embeddings, wherein larger values for the Euclidean distance indicate a higher dissimilarity the embeddings.

Comparing (614) each of the first sets of embeddings with each of the second sets of embeddings may include identifying one or more closest embedding sets based on the plurality of embedding similarity values, wherein the closest embedding set corresponds to one or more strings of the first set of structured strings that match one or more strings associated with the structured strings of the one or more documents. The closest sets may then be converted back from vector space into corresponding closest set strings or otherwise linked with the original structured strings. In the embodiment of FIG. 6, the apparatus is searching for matches between the first sets of structured strings and any one or more of one or more retrieved documents, such that there may be multiple closest sets generated. For example, any structured strings and unstructured strings from any document satisfying the similarity conditions may be included in one or more closest sets. Each closest set may include one or more matching strings based on the comparison. In the embodiment of FIG. 6, the embedding comparison is between embeddings that are based on structured strings rather than one set of unstructured strings as discussed with respect to FIGS. 4A-4C.

At step 616, the apparatus 300 is configured to identify a match in an instance in which (i) one of the retrieved documents and/or a component associated with the retrieved document matches (ii) one or more of the generated documents and/or the first document. The match may be determined in an instance in which the documents satisfy a similarity condition or are otherwise included within a closest set according to the various comparison processes disclosed herein (e.g., comparing the respective string embeddings in vector space). One or more string match matrix data structures may be generated using the first document and the matching unstructured text associated with one or more of the retrieved documents corresponding to the closest set. In some embodiments, the matching one of the retrieved documents may be compared with another document as described with respect to FIGS. 4A-4C (e.g., the matching document may be used as the "first document" in the process of FIGS. 4A-4C in an example embodiment).

At step 618, apparatus 300 may identify a duplication error associated with the retrieved documents and/or a component associated with the retrieved documents matching the first document or synthetic unstructured strings generated based on the first document. The duplication error may be detected in an instance in which the retrieved documents and/or a component associated with the retrieved documents is unprivileged with respect to the first document or a component associated with the first document. The duplication error may also be a potential or predicted error subject to verification or further review (e.g., in the instance in which a hypothetical first document or structured string is summarized by a user as an input).

At step 620, the apparatus 300 may be configured to obtain privileges regarding the one or more retrieved documents. For example, privileges associated with the first document and privileged features may be allocated to the matching retrieved document(s) and/or a component associated therewith.

At step 622, the apparatus 300 is configured to cause initiation of one or more remediation actions. Causing initiation (622) of one or more remediation actions with respect to the one or more additional components may include triggering a remediation action with respect to the duplication error. Triggering a remediation action with respect to the duplication error may include notifying a responsible party of the duplication error identified.

In at least some embodiments, apparatus 300 is configured to generate an automated message for transmission to one or more entities notifying the entity(ies) of the identified duplication error (e.g., the user of the client system 101 shown in FIG. 1 or one or more external entities 140 shown in FIG. 1, which may include the owner or otherwise controlling entity for the unpermissioned document). The apparatus 300 may be configured to prompt a user (e.g., a user of the client system 101 shown in FIG. 1) for input regarding the generated automated message. In at least some embodiments, triggering a remediation action with respect to the duplication error may include analyzing a set of historical remediation actions relative to a set of similar historical duplication errors to determine one or more predicted outcomes associated with the identified duplication error. In such embodiments, triggering a remediation action with respect to the duplication error may include generating a notification to the user and/or a message to the responsible party based at least in part on the one or more predicted outcomes.

In at least some embodiments in which the remediation is based on the matching retrieved document(s), triggering a remediation action with respect to the duplication error may include automatically initiating deletion of the duplicate document, hiding of the duplicate document, locking of the duplicate document, de-indexing or deprioritizing of the duplicate document in search results (e.g., such that the original document appears before the duplicate document in searches and/or the duplicate document does not appear), causing searches and/or links to the unpermissioned document to redirect to the subject document (e.g., avoiding dependency issues for other documents that depend on the unpermissioned document), and/or granting allocating privileges associated with the original document (e.g., to systems, parties, entities, users, or the like associated with the duplicate document). Thus, the one or more repositories may have improved document quality, search speed improved, storage space reduced, and may minimize errors associated with AI based document duplication. In some embodiments, automatically initiating removal in this manner may include automatically generating and sending a message to the responsible party requesting removal of the unpermissioned document, for example. In at least some embodiments, triggering a remediation action with respect to the duplication error may include enabling one or more privileges for the responsible party (e.g., the entity controlling the unpermissioned document) to permit their document-dependent functions to remain uninterrupted or not substantially interrupted while deduplicating and improving the one or more repositories.

Example Computing Environment

Figure 7:
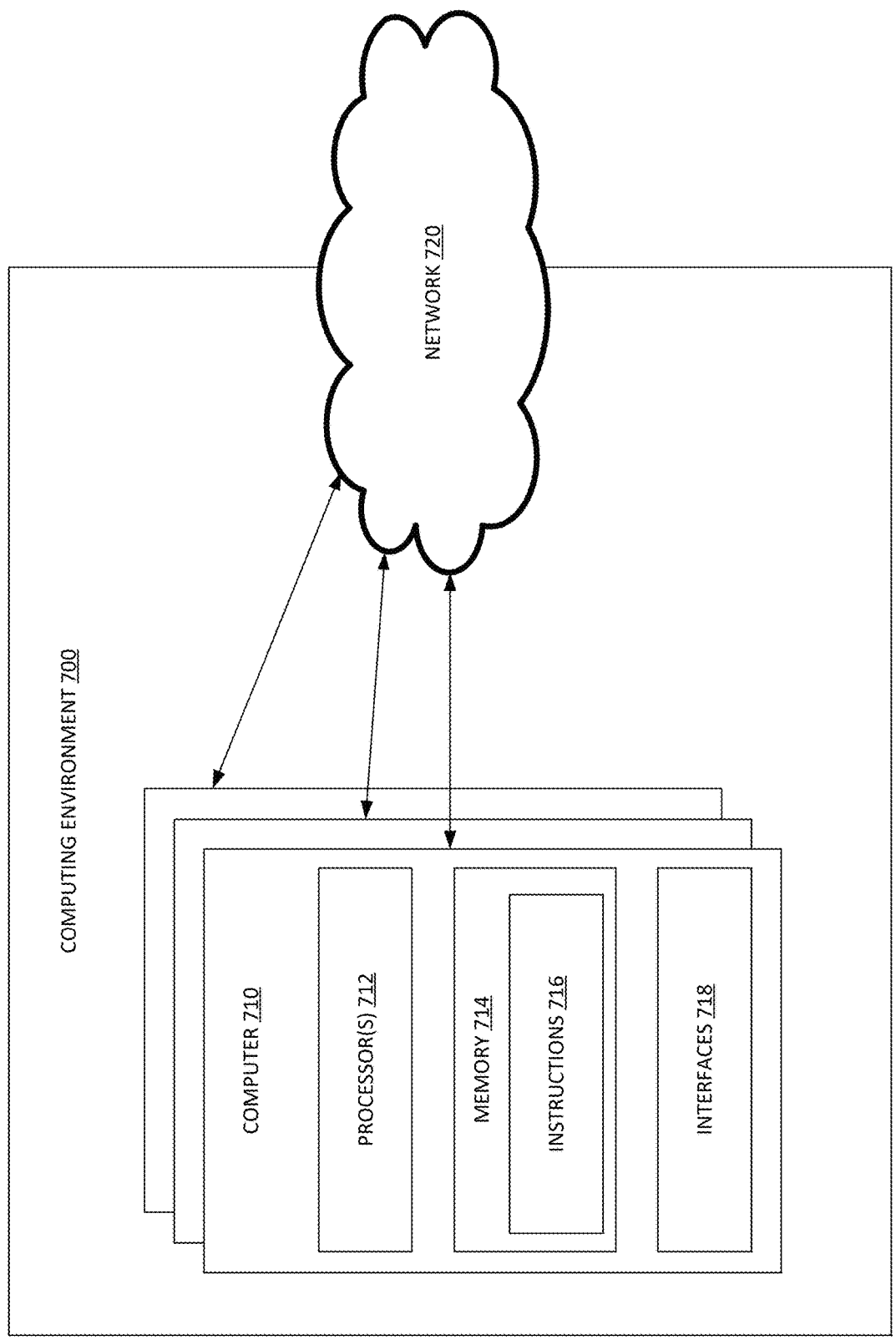
FIG. 7 discloses an example computing environment with which aspects of the present disclosure may be implemented.

FIG. 7 discloses a computing environment 700 in which aspects of the present disclosure may be implemented. A computing environment 700 is a set of one or more virtual or physical computers 710 that individually or in cooperation achieve tasks, such as implementing one or more aspects described herein. The computers 710 have components that cooperate to cause output based on input. Example computers 710 include desktops, servers, mobile devices (e.g., smart phones and laptops), wearables, virtual reality devices, augmented reality devices, expanded reality devices, spatial computing devices, virtualized devices, other computers, or combinations thereof. One or more of the computers 710 may, in some embodiments, represent the apparatus 300 shown in FIG. 3 and/or any one or more of the devices and systems shown in FIGS. 1-2, and FIG. 7 illustrates how multiple devices may operate in the computing environment 700, such as via a network 720. In some embodiments, the other computing devices may comprise devices associated with other system components, such as one or more additional AI systems 130, external entities 140, and/or database systems 120 as illustrated in FIG. 1. In particular example implementations, the computing environment 700 includes at least one physical computer.

The computing environment 700 may specifically be used to implement one or more aspects described herein. In some examples, one or more of the computers 710 may be implemented as a client device, such as mobile device and others of the computers 710 may be used to implement aspects of a machine learning framework useable to train and deploy models exposed to the mobile device or provide other functionality, such as through exposed application programming interfaces.

The computing environment 700 can be arranged in any of a variety of ways. The computers 710 can be local to or remote from other computers 710 of the computing environment 700. The computing environment 700 can include computers 710 arranged according to client-server models, peer-to-peer models, edge computing models, other models, or combinations thereof.

In many examples, the computers 710 are communicatively coupled with devices internal or external to the computing environment 700 via a network 720.

In some implementations, computers 710 can be general-purpose computing devices (e.g., consumer computing devices). In some instances, via hardware or software configuration, computers 710 can be special purpose computing devices, such as servers able to practically handle large amounts of client traffic, machine learning devices able to practically train machine learning models, data stores able to practically store and respond to requests for large amounts of data, other special purposes computers, or combinations thereof. The relative differences in capabilities of different kinds of computing devices can result in certain devices specializing in certain tasks. For instance, a machine learning model may be trained on a powerful computing device and then stored on a relatively lower powered device for use.

Many example computers 710 include one or more processors 712, memory 714, and one or more interfaces 718. In some embodiments, the processors 712 may correspond to the processor 306 shown in FIG. 3, the memory 714 may correspond to the memory 304 shown in FIG. 3 with the memory comprising instructions 716 configured to cause the processors 712 perform the functions of the analytical circuitry 312 in FIG. 3, and the one or more interfaces 718 corresponding to the interfaces 314 in FIG. 3. Such components can be virtual, physical, or combinations thereof.

The one or more processors 712 are components that execute instructions, such as instructions that obtain data, process the data, and provide output based on the processing. The one or more processors 712 often obtain instructions and data stored in the memory 714. The one or more processors 712 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the one or more processors 712 include at least one physical processor implemented as an electrical circuit. Example providers of processors 712 include INTEL, AMD, QUALCOMM, TEXAS INSTRUMENTS, and APPLE.

The memory 714 is a collection of components configured to store instructions 716 and data for later retrieval and use. The instructions 716 can, when executed by the one or more processors 712, cause execution of one or more operations that implement aspects described herein. In many examples, the memory 714 is a non-transitory computer readable medium, such as random-access memory, read only memory, cache memory, registers, portable memory (e.g., enclosed drives or optical disks), mass storage devices, hard drives, solid state drives, other kinds of memory, or combinations thereof. In certain circumstances, transitory memory 714 can store information encoded in transient signals.

The one or more interfaces 718 are components that facilitate receiving input from and providing output to something external to the computer 710, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors such as those using the Global Positioning System), other input components, or combinations thereof (e.g., a touch sensitive display). The one or more interfaces 718, such as a communication interface, can include components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as according to WI-FI, cellular, BLUETOOTH, ZIGBEE, or other protocols). One or more of the one or more interfaces 718 can facilitate connection of the computing environment 700 to a network 720.

The network 720 is a set of devices that facilitate communication from a sender to a destination, such as by implementing communication protocols. Example networks include local area networks, wide area networks, private networks such as an intranet, public networks such as the Internet, or any combination thereof. The network may include any wired or wireless communication network including, for example, a wired or wireless local area network (LAN), personal area network (PAN), metropolitan area network (MAN), wide area network (WAN), or the like, as well as any hardware, software and firmware required to implement it (such as, e.g., network routers, etc.). For example, communications network may include a cellular telephone, an 802.11, 802.16, 802.20, or WiMax network. The network may utilize a variety of networking protocols now available or later developed including, but not limited to Transmission Control Protocol, Internet Protocol, etc.

The computers 710 can include any of a variety of other components to facilitate the performance of operations described herein. Example components include one or more power units (e.g., batteries, capacitors, power harvesters, or power supplies) that provide operational power, one or more buses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries or packages (e.g., that provide functions for obtaining, processing, and presenting data, such as may be obtained using a package manager like PIP or CONDA), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT by MICROSOFT or CODE LLAMA by META).

In some examples, large language models can be used to understand natural language, generate natural language, or perform other tasks. Examples of such large language models include CHATGPT by OPENAI, a LLAMA model by META, a CLAUDE model by ANTHROPIC, others, or combinations thereof. Such models can be fine-tuned on relevant data using any of a variety of techniques to improve the accuracy and usefulness of the answers. The models can be run locally on servers or client devices or accessed via an application programming interface. Some of those models or services provided by entities responsible for the models may include other features, such as speech-to-text features, text-to-speech, image analysis, research features, and other features, which may also be used as applicable.

Example Machine Learning Framework

FIG. 8 illustrates an example machine learning framework 800 that techniques described herein may benefit from or improve upon. A machine learning framework 800 is a collection of software and data that implements artificial intelligence trained to provide output, such as predictive data, based on input. The machine learning framework 800 of FIG. 8 may be configured to train any one or more of the AI models shown and described in the present disclosure, including the AI systems. Examples of artificial intelligence that can be implemented with machine learning way include neural networks (including recurrent neural networks), language models (including so-called "large language models"), generative models, natural language processing models, adversarial networks, decision trees, Markov models, support vector machines, genetic algorithms, others, or combinations thereof. A person of skill in the art having the benefit of this disclosure will understand that these artificial intelligence implementations need not be equivalent to each other and may instead select from among them based on the context in which they will be used. Machine learning frameworks 800 or components thereof are often built or refined from existing frameworks, such as TENSORFLOW by GOOGLE, INC. or PYTORCH by the PYTORCH community. The machine learning frameworks 800 may correspond to techniques as leveraged by the various data processors as described herein for various data processing functions.

The machine learning framework 800 can include one or more models 802 that are the structured representation of learning and an interface 804 that supports use of the model 802. The model 802 may take any of a variety of forms. In many examples, the model 802 includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the model 802 can include a representation of memory (e.g., providing long short-term memory functionality). Where the set includes more than one model 802, the models 802 can be linked, cooperate, or compete to provide output.

The interface 804 can include software procedures (e.g., defined in a library) that facilitate the use of the model 802, such as providing a way to establish and interact with the model 802. For instance, the software procedures can include software for receiving input, preparing input for use (e.g., by performing vector embedding, such as using Word2Vec, BERT, or another technique), processing the input with the model 802, providing output, training the model 802, performing inference with the model 802, fine tuning the model 802, other procedures, or combinations thereof.

In an example implementation, interface 804 can be used to facilitate a training method 810. The training method 810 may include operation 812, which includes establishing a model 802, such as initializing a model 802. The establishing can include setting up the model 802 for further use (e.g., by training or fine tuning). The model 802 can be initialized with values. In examples, the model 802 can be pretrained.

Operation 814 can follow operation 812. Operation 814 includes obtaining training data; in many examples, the training data includes pairs of input (e.g., training sequence data objects and respective contextual data objects) and desired output (e.g., labels) given the input. In supervised or semi-supervised training, the data can be prelabeled, such as by human or automated labelers. In unsupervised learning the training data can be unlabeled.

Many examples herein are related to supervised prediction of disruptions to pinpoint the weights or importance of events. But certain embodiments may operate without explicit labels but with implicit labels computed based on other data, thus data need not be explicitly labeled. But it can be beneficial to use an input labeler to infer labels and to train a supervised model.

The training data can include validation data used to validate the trained model 802. Operation 816 can follow operation 814. Operation 816 includes providing a portion of the training data to the model 802. This can include providing the training data in a format usable by the model 802. The machine learning framework 800 (e.g., via the interface 804) can cause the model 802 to produce an output based on the input.

Operation 818 can follow operation 816. Operation 818 includes comparing the expected output with the actual output. In an example, this can include applying a loss function to determine the difference between expected and actual data. This value can be used to determine how training is progressing. Operation 820 can follow operation 818. Operation 820 includes updating the model 802 based on the result of the comparison. This can take any of a variety of forms depending on the nature of the model 802. Where the model 802 includes weights, the weights can be modified to increase the likelihood that the model 802 will produce correct output given an input. Depending on the model 802, backpropagation or other techniques can be used to update the model 802.

Operation 822 can follow operation 820. Operation 822 includes determining whether a stopping criterion has been reached, such as based on the output of the loss function (e.g., actual value or change in value over time). In addition, or instead, whether the stopping criterion has been reached can be determined based on a number of training epochs that have occurred or an amount of training data that has been used. In some examples, satisfaction of the stopping criterion can include if the stopping criterion has not been satisfied, the flow of the method can return to operation 814. If the stopping criterion has been satisfied, the flow can move to operation 822.

Operation 824 includes deploying the trained model 802 for use in production, such as providing the trained model 802 with real-world input data and produce output data used in a real-world process. The model 802 can be stored in memory 714 of at least one computer 710 or distributed across memories of two or more such computers 710 for production of output data.

The use of a computer and network implemented system in generating outputs, and associated electronic communications, enables leveraging of machine learning processes, neural networks, and attention mechanisms to efficiently extract meaningful outputs from large datasets, by embedding respective contextual data in the attention mechanism along with respective sequence data objects. Accordingly, example embodiments provide improvements over systems that merely process input sequences, or sequence data objects, without context. The improvements may be realized with input data that spans long timeframes of multiple sequence events. The generated outputs are also more accurate and are able to detect latent and hidden relationships between multiple sequenced events.

Example embodiments may simultaneously consider multiple types of contextual data objects (e.g., subsequence contexts, token-level contexts, and token-to-token contexts). Example embodiments, learn, understand, and predict latent pattern of data not only considering the sequence data object, such as transactional data, but further contextualize each sequence within its context-including any known subsequence contexts, token-level contexts, and token-to-token contexts. Example embodiments further leverage the attention mechanism to provide an importance scoring or weighting of the features within an input sequence as well as in the contextual data.

Additionally, example embodiments may create one model across all subjects and entities, to make generalization across users, demographics, or other groupings of people or entire populations. Example embodiments may therefore generate a foundational model that directly enables various downstream application and tasks.

By sharing model parameters and applying transfer learning techniques across customers, example embodiments can leverage the knowledge gained from one customer's transactional data to improve the forecasting for another. This transfer of learning allows the model to generalize across customers and capture common patterns and trends, resulting in more accurate predictions.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage training of a machine learning model with a diverse set of training data. Further, the policy can encourage testing for and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination within a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together within a single software product or packaged into multiple software products.

Thus, embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The various embodiments described herein are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims. Although specific terms are employed herein, they are used in a generic and descriptive sense only and not for purposes of limitation.

The invention claimed is:

1. A method for remediating duplication errors associated with first and second documents, the method comprising:
   with a set of one or more processors:
      obtaining a first document, wherein the first document comprises first document text content;
      obtaining a second document, wherein the second document comprises:
         second document first text content;
         second document second text content having delimiters in the form of one or more symbols or tags; and
         second document image content;
      generating, using a string generation engine, a first document string set of first document strings associated with the first document;
      generating, using the string generation engine, a second document string set of second document strings associated with the second document;
      generating, based on the second document second text content but not on the second document first text content, a second document string subset of the second document strings;
      dividing the second document string subset into second document substrings based at least on the delimiters;
      generating a synthetic substring set of synthetic substrings, wherein the generating includes, for each respective second document substring of the second document substrings:
         synthesizing, using a multimodal generative artificial intelligence model, first related content from the second document first text content based on relevance to the respective second document substring;
         synthesizing, using the multimodal generative artificial intelligence model, second related content from the second document second text content based on relevance to the respective second document substring;
         synthesizing, using the multimodal generative artificial intelligence model, third related content from the second document image content based on a relevance to the respective second document substring; and
         generating, for inclusion in the synthetic substring set, a respective synthetic substring associated with the respective second document substring by providing the first related content, the second related content, and the third related content as input to the multimodal generative artificial intelligence model;
      embedding the first document string set into vector space as first document embeddings using an embedding function;
      embedding the synthetic substring set into the vector space as synthetic embeddings using the embedding function;
      generating closest embedding sets, wherein the generating includes, for each respective synthetic embedding of the synthetic embeddings:
         comparing in the vector space using an embedding similarity algorithm the respective synthetic embedding with each respective first document embedding of the first document embeddings to generate embedding similarity values, each respective embedding similarity encoding a quantitative expression of similarity between the respective synthetic embedding and a respective first document embedding; and
         forming a closest embedding set that includes each of the first document embeddings that have an embedding similarity value to the respective synthetic embedding that satisfies a predetermined similarity value threshold or has a highest embedding similarity value;
      for each respective second document substring of the second document substrings:
         identifying an associated closest embedding set of the closest embedding sets that is associated with the respective second document substring;
         identifying a matching synthetic second document substring associated with the associated closest embedding set;
         identifying a plurality of matching first document strings of the first document strings that are associated with the associated closest embedding set;

generating a respective linking string, using (1) the respective second document substring, (2) the matching synthetic second document substring, (3) the plurality of matching first document strings, and (4) a linking string generator, wherein the respective linking string describes an association between the respective second document substring and the matching first document strings; and generating, a string match matrix data structure comprising (1) rows ordered based on an ordering of the second document second text content and (2) columns, wherein each respective row is associated with at least one respective second document substring of the second document substrings and comprising:
  a first cell associated with the respective row and a first column of the columns, wherein the first cell includes the at least one second document substring,
  a second cell associated with the respective row and a second column of the columns, wherein the second cell comprises a linking string associated with the at least one respective second document substring; and
  a third cell associated with the respective row and a third column of the columns, wherein the third cell includes the one or more first document strings used to generate the linking string of the second cell;

detecting a duplication error based on the string match matrix data structure;

transmitting a confirmation request regarding the duplication error, wherein the confirmation request includes the string match matrix data structure, and requests confirmation regarding initiating a remediation action selected from the group consisting of: deletion of the first document, hiding the first document, locking the first document, de-indexing the first document from search results, deprioritizing the first document in search results, redirecting links to the first document to the second document, granting privileges associated with the second document, allocating privileges associated with the second document.

2. The method of claim 1, further comprising:
receiving a response to the confirmation request regarding the duplication error; and
initiating the remediating action based on the response indicating to proceed.

3. The method of claim 1, further comprising:
after obtaining one of but not both the first document and the second document:
  generating, using a generative artificial intelligence system, synthetic strings based on the obtained document; and
  identifying, by the one or more processors, the other of the first document or the second document based on a similarity to the synthetic strings.

4. The method of claim 1, wherein obtaining the first document comprises:
access a first document set that includes the first document;
access a second document set that includes the second document;
for each respective document of the second document set:
  extracting an extracted string from the respective document;
  generating a synthetic string based on the extracted string;
  comparing the synthetic string with each of document in the first document set; and
  determining to obtain the first document from among the first document set based on a similarity of the first document to the synthetic string being greater than a similarity of other documents of the first document set or greater than a threshold similarity.

5. The method of claim 4, further comprising;
generating the first document set, wherein the generating includes:
  crawling sub-domains within a web domain; and
  capturing each respective sub-domain as a respective document of the first set of documents.

6. The method of claim 1, wherein obtaining the second document comprises:
generating, using the string generation engine, a synthetic string;
for each respective document of a set of documents that includes the second document:
  generating a similarity score based on a similarity between the synthetic string and the respective document; and
  identifying the second document as having a highest similarity score or as being above a threshold similarity score.

7. The method of claim 1,
wherein the first document has a first style;
wherein the second document has a second style different from the first;
wherein obtaining the first document comprises:
  generating, using the string generation engine, a synthetic string based on the second document substrings and mimicking the first style rather than the second style;
  for each respective document of a document set that includes the first document:
    generating a similarity score describing a similarity between the synthetic string and the respective document; and
    identifying the first document based on the first document having a highest similarity score or the similarity score being above a threshold similarity score.

8. The method of claim 1,
wherein the first document includes first document text content and first document image content;
wherein the string generation engine includes a multimodal model; and
wherein the generating, using the string generation engine, the first document string set includes generating at least some of the first document strings based on the first document image content.

9. The method of claim 1,
wherein at least one first cell includes image content based on the first document image content; or
wherein at least one second cell includes image content based on the second document image content.

10. The method of claim 1, wherein the second document comprises one or more privileged portions relevant to the first document.

11. The method of claim 1, wherein the second document substrings comprise structured substrings corresponding to unstructured strings of the first document.

12. The method of claim 1, wherein obtaining the first document includes:

receiving a document generation contextual construct; and generating, using a string generation engine, the first document based at least in part on the document generation contextual construct.

13. The method of claim 1, further comprising:

generating, by the one or more processors, a document generation contextual construct using a predetermined list of document objectives, wherein the predetermined list of document objectives is determined based on a frequency of one or more of the list of document objectives in a plurality of heterogeneously privileged document repositories.

14. The method of claim 1, wherein obtaining the second document comprises:

identifying a target component;

generating, using the string generation engine and based on the target component, a target component description;

retrieving one or more documents including the second document;

embedding into vector space, using an embedding function, the one or more documents and the target component description;

detecting satisfaction of a similarity condition between a location of the second document in vector space and the target component description in vector space; and responsive to detecting the satisfaction, determining to obtain the second document.

15. The method of claim 14, wherein generating the target component description includes:

receiving a document generation contextual construct comprising one or more strings describing the target component and one or more configurations; and generating, based at least in part on the document generation contextual construct, the first set of structured strings describing the target component.

16. The method of claim 1, wherein obtaining the first document comprises:

receiving the second document comprising the second document string subset of second document strings defining one or more privileged features;

generating, using a string generation engine, one or more third sets of synthetic strings based on the second document;

retrieving one or more additional documents, including the first document, each additional document comprising a respective additional document string set, with the respective additional document string set for the first document being the first document string set;

converting the one or more third sets of synthetic strings into one or more third embeddings;

converting each of the respective additional document string sets into one or more fourth embeddings;

in vector space, comparing the one or more third embeddings and each of fourth embeddings; and detecting, based on the comparison, satisfaction of a similarity condition between at least one of the one or more third embeddings and at least one of the fourth embeddings associated with the first document.

17. A computer program product comprising computer executable instructions that, when executed by one or more processors, are configured to:

obtain a first document;

obtain a second document;

generate, using a string generation engine, a first document string set associated with the first document;

generate, using the string generation engine, a second document string set associated with the second document;

generate, based at least in part on the second document string set, a second document string subset;

divide the second document string subset into a second document substrings;

transform the second document substrings into a synthetic substring set, wherein the transforming includes augmenting respective ones of the second document substrings with context extracted from others of the second document substrings;

convert, using an embedding function, the first document string set into a first document embeddings in vector space;

convert, using the embedding function, the synthetic substrings into a synthetic embeddings in vector space;

generate closest embedding sets, wherein the generating includes, for each respective synthetic embedding of the synthetic embeddings:

comparing in the vector space using an embedding similarity algorithm the respective synthetic embedding with each respective first document embedding of the first document embeddings to generate embedding similarity values, each respective embedding similarity value encoding a quantitative expression of similarity between the respective synthetic embedding and a respective first document embedding; and forming a closest embedding set that includes each of the first document embeddings that have an embedding similarity value to the respective synthetic embedding that satisfies a predetermined similarity value threshold;

for each respective second document substring of the second document substrings:

generate, using a respective closest embedding set of the closest embedding sets and a linking string generator, a linking string defining an association between the respective second document substring and one or more respective portions of the first document; and generate a string match matrix data structure comprising (1) rows ordered based on an ordering of the second document second text content and (2) columns, wherein each respective row is associated with at least one respective second document substring of the second document substrings and comprising:

a first cell associated with the respective row and a first column of the columns, wherein the first cell includes the at least one second document substring, a second cell associated with the respective row and a second column of the columns, wherein the second cell comprises a linking string associated with the at least one respective second document substring; and a third cell associated with the respective row and a third column of the columns, wherein the third cell includes the one or more first document strings used to generate the linking string of the second cell.

18. The computer program product of claim 17, the computer executable instructions, when executed by the one or more processors, being further configured to:

obtain a third document comprising a third document string;

generate, using a generative artificial intelligence system, third document synthetic strings based on the third document string; and identify one of the first document or the second document based on a similarity of the identified document to one or more of the third document synthetic strings.

19. A system comprising a set of one or more processors and a set of at least one non-transitory computer readable medium storing computer executable instructions that, when executed by the one or more processors, are configured to cause the system to:

obtain a first document;

obtain a second document;

generate, using a string generation engine, a first document string set associated with the first document;

generate, using the string generation engine, a second document string set associated with the second document;

generate, based at least in part on the second document string set, a second document string subset that is a proper subset of the second document string set;

divide the second document string subset into second document substrings;

generate a synthetic substring set of synthetic substrings by transforming the second document substrings into a synthetic substring set comprising the synthetic substrings by augmenting respective ones of the second document substrings with context extracted from others of the second document substrings to generate a second plurality of synthetic substrings;

convert, using an embedding function, the first document string set into a first document embeddings in vector space;

convert, using the embedding function, the synthetic substrings into synthetic embeddings in vector space;

in vector space, for each respective embedding of the second plurality of embeddings generate a closest embedding set of one or more first document embeddings, wherein to generate the closest embedding set includes to:

compare, using a embedding similarity algorithm, the first document embeddings and a respective synthetic embedding of the synthetic embeddings to generate a plurality of embedding similarity values; and identify the closest embedding set of the one or more embeddings;

for each respective substring of the second document substrings:

generate, using a respective one of the closest embedding sets and a linking string generator, a linking string defining an association between the respective substring and one or more respective first document portions; and generate a string match matrix data structure comprising a plurality of substring rows, each substring row being associated with one of the respective substrings of the second document substrings, wherein each of the plurality of substring rows comprises:

a first cell describing the respective substring;

a second cell describing the one or more respective portions of the first document corresponding to the closest embedding set associated with the respective embedding corresponding to the respective substring; and a third cell comprising the linking string associated with the respective substring.

20. The system of claim 19, the computer executable instructions, when executed by the one or more processors, being further configured to:

obtain a third document comprising a third document string;

generate, using a generative artificial intelligence system, third document synthetic strings based on the third document string; and identify one or both of the first document or the second document based on a similarity to at least one of the third document synthetic strings.

\* \* \* \* \*